United States Patent
Starsinic et al.

(10) Patent No.: US 11,323,862 B2
(45) Date of Patent: May 3, 2022

(54) TRAFFIC STEERING AT THE SERVICE LAYER

(71) Applicant: CONVIDA WIRELESS, LLC, Wilmington, DE (US)

(72) Inventors: Michael F. Starsinic, Newtown, PA (US); Dale N. Seed, Allentown, PA (US); William Robert Flynn, IV, Schwenksville, PA (US); Vinod Kumar Choyi, Conshohocken, PA (US); Quang Ly, North Wales, PA (US); Shamim Akbar Rahman, Cote St. Luc (CA); Zhuo Chen, Claymont, DE (US); Yogendra C. Shah, Exton, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 69 days.

(21) Appl. No.: 16/099,316

(22) PCT Filed: May 4, 2017

(86) PCT No.: PCT/US2017/030948
§ 371 (c)(1),
(2) Date: Nov. 6, 2018

(87) PCT Pub. No.: WO2017/192791
PCT Pub. Date: Nov. 9, 2017

(65) Prior Publication Data
US 2019/0158997 A1    May 23, 2019

Related U.S. Application Data

(60) Provisional application No. 62/332,590, filed on May 6, 2016.

(51) Int. Cl.
*G06F 15/173* (2006.01)
*H04W 4/70* (2018.01)
(Continued)

(52) U.S. Cl.
CPC ............... *H04W 4/70* (2018.02); *H04L 12/14* (2013.01); *H04L 12/1403* (2013.01);
(Continued)

(58) Field of Classification Search
CPC . H04L 12/14; H04L 12/1403; H04L 47/2441; H04M 15/00; H04M 15/68;
(Continued)

(56) References Cited

U.S. PATENT DOCUMENTS

2012/0047551 A1* 2/2012 Pattar ..................... H04W 4/00
                                                                    726/1
2013/0013793 A1* 1/2013 Sanchez Herrero .... H04L 67/12
                                                                    709/227
(Continued)

FOREIGN PATENT DOCUMENTS

CN    103782612 A    5/2014
CN    104685957 A    6/2015
(Continued)

OTHER PUBLICATIONS

Swetina et al, "Toward a Standardized Common M2M Service Layer Platform: Introduction to oneM2M", 2014, IEEE, p. -26 (Year: 2014).*
(Continued)

*Primary Examiner* — Ryan J Jakovac
(74) *Attorney, Agent, or Firm* — BakerHostetler

(57) ABSTRACT

It is recognized herein that current approaches to traffic steering in M2M systems lack capabilities, particularly with respect to traversing value added services in an operator's network. As described herein, nodes or apparatuses at a
(Continued)

machine-to-machine (M2M) service layer can leverage value added services that are deployed in an operator's network. The M2M service layer may add metadata to downlink traffic so that the metadata can be used to assist with steering and processing data in the operator's value added services (VASs) network. By of example, the M2M service layer can use a control plane interface to push polices into a network operator's VASs network, and to allow functions in the VASs network to extract information from the M2M service layer.

11 Claims, 22 Drawing Sheets

(51) Int. Cl.
- H04L 47/2441 (2022.01)
- H04W 4/24 (2018.01)
- H04L 12/14 (2006.01)
- H04M 15/00 (2006.01)
- H04L 67/00 (2022.01)
- H04W 40/02 (2009.01)
- H04W 28/02 (2009.01)
- H04W 80/08 (2009.01)

(52) U.S. Cl.
CPC .......... *H04L 47/2441* (2013.01); *H04L 67/00* (2013.01); *H04M 15/00* (2013.01); *H04M 15/68* (2013.01); *H04W 4/24* (2013.01); *H04W 40/02* (2013.01); *H04W 28/02* (2013.01); *H04W 80/08* (2013.01)

(58) Field of Classification Search
CPC ....... H04W 28/02; H04W 40/02; H04W 4/24; H04W 4/70; H04W 80/08
See application file for complete search history.

(56) References Cited

U.S. PATENT DOCUMENTS

| | | | | |
|---|---|---|---|---|
| 2017/0134523 | A1* | 5/2017 | Wu | H04L 67/327 |
| 2018/0183897 | A1* | 6/2018 | Singhal | H04L 67/42 |
| 2019/0222653 | A1* | 7/2019 | Dauneria | G05B 19/0423 |

FOREIGN PATENT DOCUMENTS

| | | |
|---|---|---|
| JP | 2016-039631 A | 3/2016 |
| WO | 2011/030490 A1 | 3/2011 |
| WO | 2014/182900 A1 | 11/2014 |
| WO | 2017/023741 A1 | 2/2017 |

OTHER PUBLICATIONS

3GPP TR 23.718 v1.1.0, "3rd Generation Partnership Project; Technical Specification Group Services and System Aspects; Architecture Enhancement for Flexible Mobile Service Steering (Release 13)", Jul. 2015, 38 pages.

3GPP TS 23.203 V13.7.0, Technical Specification, 3rd Generation Partnership Project; Technical Specification Group Services and system Aspects; Policy and Charging Control Architecture (Release 13), Mar. 2016, 242 pages.

3GPP TS 29.212 V13.5.0 Technical Specification, "3rd Generation Partnership Project; Technical Specification Group Core Network and Terminals; Policy and Charging Control (PCC); Reference Points (Release 13)", Mar. 2016, 257 pages.

3GPP TS 29.213 V13.5.0, Technical Specification, "3rd Generation Partnership Project; Technical Specification Group Core Network and Terminals; Policy and Charging Control Signalling Flows and Quality of Service (QoS) Parameter Mapping (Release 13)", Mar. 2013, 221 pages.

3GPP TS 29.214 V13.5.0, "3rd Generation Partnership Project; Technical Specification Group Core Network and Terminals; Policy and Charging Control Over Rx Reference Point (Release 13)", Mar. 2016, 67 pages.

3GPP TSG SA Meeting #66, TD SP-140703, Maui, Hawaii, "Updated WID for Flexible Mobile Service Steering (FMSS)", Dec. 2014, 6 pages.

ETSI TS 102690 V2.0.14 Technical Specification, "Machine-to Machine Communications (M2M); Functional Architecture", Jul. 2013, 332 pages.

ETSI TS 123682 V13.5.0, Technical Specification, Digital Cellular Telecommunications System (Phase 2+) (GSM); Universal Mobile Telecommunications system (UMTS); LTE; Architecture Enhancements to Facilitate Communications With Packet Data Networks and Applications (3GPP TS 23.682 version 13.5.0 Release 13), Apr. 2016, 95 pages.

Halpern et al., Internet engineering Task Force (IETF) RFC: 7665, "Service Function Chaining (SFC) Architecture", Oct. 2015 32 pages.

OneM2M Technical Specification TS-0001 V2.3.0, "Function Architecture", Aug. 2015, 352 pages.

Quinn et al., Network Working Group, Internet-Draft, "Network Service Headerdraft-quinn-sfc-nsh-07.txt", Feb. 2015, 43 pages.

3GPP TR 23. 718, "3rd Generation Partnership Project; Technical Specification Group Services and System Aspects; Architecture enhancement for flexible mobile service steering", V13.0.0, Sep. 2015, 38 pages.

"3rd Generation Partnership Project; Technical Specification Group Services and System Aspects; Architecture Enhancement for Flexible Mobile Service Steering (Release 13)", 3GPP Draft; 23718-FMSS-110-CL, 3rd Generation Partnership Project (3GPP), Mobile Competence Centre ; 650, Route Des Lucioles ; F-06921 Sophia-Antipolis Cedex ; France Jul. 20, 2015 (Jul. 20, 2015), XP050988761.

Etsi: "ETSI TS 123 682 V13.5.0", 1-12 Apr. 1, 2016 (Apr. 1, 2016), pp. 1-91, XP055385009, Retrieved from the Internet: https://www.etsi.org/deliver/etsi_ts/123600_123699/123682/13.05.00_60/ts_123682v130500p.pdf Vodafone Group PLC: "TS 101 603-3GPP 1-12 Connectivity and 3GPP services;M2M(12)20_057r2_TS_101_603_-_3GPP_Connectivity_and_3GPP_services", ETSI Draft; M2M(12)20_057R2_TS_101_603_-_3GPP_Connectivity_and_3GPP_Services, European Telecommunications Standards Institute (ETSI), 650, Route Des Luci0les; F-06921 Sophia-Antip0lis; France, vol. SmartM2M, Jun. 7, 2012.

* cited by examiner

-Prior Art-

TRAFFIC STEERING AT THE SERVICE LAYER

CROSS REFERENCE TO RELATED APPLICATIONS

This application is a National Stage Application filed under 35 U.S.C. 371 of International Application No. PCT/US2017/030948 filed May 4, 2017, which claims the benefit of U.S. Provisional Patent Application Ser. No. 62/332,590 filed May 6, 2016, the disclosures of which are incorporated by reference as if set forth in their entireties herein.

BACKGROUND

A machine to machine (M2M) or Internet of Things (IoT) (M2M/IoT) Service Layer (SL) is a technology specifically targeted toward providing value added services (VASs) for M2M/IoT devices and applications. Industry standard bodies (e.g., oneM2M, ETSI) have been developing M2M/IoT service layers (SLs) to address challenges associated with the integration of M2M/IoT devices and applications with the Internet/Web, cellular networks, enterprise networks, and home network networks.

An M2M/IoT SL can provide applications and devices access to a collection of M2M/IoT oriented capabilities. Examples of capabilities include security, charging, data management, device management, discovery, provisioning, and connectivity management. These capabilities are made available to applications via application programming interfaces (APIs) that make use of message formats, resource structures, and resource representations supported by the M2M/IoT SL.

From a protocol stack perspective, SLs are typically situated above the application protocol layer. SLs generally provide value added services to applications that they support. Thus, SLs are often categorized as 'middleware' services. FIG. 1 shows an example service layer 102 depicted between application protocols 104 and applications 106.

The oneM2M standard defines an M2M/IoT SL. Generally, the purpose of the SL is to provide "horizontal" services that can be utilized by different "vertical" M2M systems and applications, such as e-Health, fleet management, and smart homes for example. FIG. 2 depicts an example 200 of the architecture of the oneM2M SL. As shown, the architecture defines a Common Service Entity (CSE) 202 that supports four reference points. The Mca reference point interfaces with the Application Entity (AE) 204. The Mcc reference point interfaces with another CSE 202 within the same service provider domain and the Mcc' reference point interfaces with another CSE in a different service provider domain. The Mcn reference point interfaces with the underlying network service entity (NSE) 206. The NSE 206 provides underlying network services to the CSEs 202. Example network services include, without limitation, device management, location services, and device triggering. A CSE contains multiple logical functions referred to as Common Service Functions (CSFs), which include, by way of example, "Discovery" and "Data Management & Repository". FIG. 3 illustrates CSFs supported by oneM2M.

Referring also to FIG. 4, the oneM2M architecture enables various nodes, such as an application service node (ASN), an application dedicated node (ADN), a middle node (MN), an infrastructure node (IN), and the a non-oneM2M node (NoDN). An ASN refers to a node that contains one CSE and contains at least one AE. By way of example, an ASN can reside in an M2M device. An ADN refers to a node that contains at least one AE and does not contain a CSE. There may be zero or more ADNs in the field domain of the oneM2M system. By way of example, an ADN may reside in a constrained M2M device. An MN refers to a node that contains one CSE and contains zero or more AEs. There may be zero or more MNs in the field domain of the oneM2M system. By way of example, an MN can reside in an M2M gateway. An IN refers to a node that contains one CSE and zero or more AEs. Currently, there is exactly one IN in the infrastructure domain per oneM2M service provider. A CSE in an IN may contain CSE functions that are not applicable to other node types. By way of example, an IN may reside in an M2M service infrastructure. An NoDN refers to a node that does not contain oneM2M entities (neither AEs nor CSEs). Such nodes include devices attached to the oneM2M system for interworking purposes, such as management purposes for example. FIG. 4 also shows examples of various configurations of how the nodes described above can be interconnected within a oneM2M system.

Turning now to application awareness in Evolved Packet Core (EPC), 3GPP-based networks generally provide IP bearer services to its subscribers with an agreed upon level of quality of service (QoS). The support given to external third party applications for controlling IP flows is generally very limited. For example, third parties may be able to request that the EPC provide specific QoS treatment to particular IP flows. The application awareness level in 3GPP networks is mainly controlled by the Policy and Charging Control (PCC) architecture, for instance the example PCC architecture 500 that is shown in FIG. 5.

Referring to FIG. 5, 3GPP networks can be configured to detect certain application flows using service data flow (SDF) templates. Service data flow (SDFs) may be statically configured and they may be associated with a PCC rule. SDFs are used to identify application flows for enforcing certain policies, charging, and applying QoS treatment to those flows as per the PCC rule. The use of SDFs in the PCC architecture 500 is defined 3GPP TS 23.203, Policy and Charging Control Architecture.

Still referring to FIG. 5, a Traffic Detection Function (TDF) 502 may be present in 3GPP networks to detect certain kinds of applications. The TDF may employ deep packet inspection (DPI) to detect applications. A TDF may provide the SDF details of the identified applications to a Policy and Charging Rules Function (PCRF) 504, or if the SDF description is not possible, for example, the TDF 502 may perform gating or Redirection or Bandwidth limitation for the detected applications. The functionality of the TDF 504, its procedures, and the Sd interface between the PCRF 504 and TDF 502 are further described in 3GPP TS 23.203 (referenced above); 3GPP TS 29.212, Policy and Charging Control Reference Points; and 3GPP TS 29.213, Policy and Charging Control Signaling Flows and Quality of Service (QoS) Parameter Mapping.

An Application Function (AF) Interface (Rx) between an AF 506 and the PCRF 504 is shown in FIG. 5. The Rx Interface is used by application functions that require dynamic policy and/or charging control over the IP connectivity access network (CAN) user plane behavior. The AF 506 can communicate with the PCRF 504 to transfer session information that is required for PCRF decisions. The AF 506 can also communicate with the PCRF 504 to receive IP CAN specific information and notifications about IP CAN bearer level events. An AF cannot delegate any application layer functions to the 3GPP core network (CN). The functionality of the AF, its procedures, and the Rx interface functions used to exchange application level session information between the PCRF and the AF are further described in 3GPP TS 23.203 (referenced above) and 3GPP TS 29.214, Policy and Charging Control over the Rx Reference Point. Value added service can be deployed as Network Functions (NFs) in a 5G (NR) mobile core network.

With respect to telecom value added services, the term (S)Gi-LAN refers to the packet data network (PDN) that sits between the Gateway General Packet Radio Service (GPRS) Support Node (GGSN) or the PDN gateway (P-GW), shown collectively for simplicity in FIG. 6 as a GGSN/P-GW 601, of the mobile core network and the Internet. The (S)Gi-LAN is under control of the mobile network operator (MNO). When uplink data packets leave the (S)Gi-LAN, they are no longer under control of the MNO and can be generally considered to have gone to the public internet or another operator's network, as shown by the illustrated boundary between the operator domain 602 and the public internet 604 shown in FIG. 6. As shown, an example (S)Gi-LAN may include Value Added Services (VASs). Examples of VASs include network address translations (NATs), Firewalls, Video Compression, Data Compression, load balancers, HTTP Header Enrichment functions, TCP optimizers, etc. Generally, Deep Packet Inspection (DPI) techniques determine if each VAS should operate on a data flow. Traffic may be routed to/from the (S)Gi-LAN 606 and Servers in the public Internet, such as an M2M Server 608. Alternatively, the M2M Server 608 can be deployed within the (S)Gi-LAN 606.

The IETF has developed an architecture framework for deploying value added services (VAS's), or "Service Functions". The architecture framework is described in detail in IETF, Service Function Chaining Working Group, Internet Draft, Service Function Chaining (SFC) Architecture. The framework allows traffic to be "steered" through just the services that apply to each individual flow, rather than requiring that all traffic be serially routed through all service functions. In an example 3GPP deployment, packets from the (S)Gi-LAN travel via the Public Internet to the M2M Server and visa-versa, however, some packets are intercepted and routed through value added services. FIG. 7 shows one example of how value added services may be deployed. FIG. 7 also depicts main components of the IETF's SFC architecture framework.

As shown in FIG. 7, a Service Classification Function (SCF) 702 accepts input packets. The SCF 702 may encapsulate the input packets with another header. The SCF 702 may determine Service Functions 704 through which the packet should be routed. The SCF 702 may further determine the order that a packet should be routed through the service functions 704, and attach metadata to the packet to assist the service functions 704. In some 3GPP deployment scenarios (e.g., a traditional (S)Gi-LAN), the input packets may be IP packets from the P-GW/GGSN or the Internet. Still referring to FIG. 7, a Service Function Forwarder (SFF) 706 may accept packets from the SCF 702 and route them through the Service Functions 704. Once a packet has been routed through its service path, the SFF 706 may forward the packet to an egress node 708. The Egress node 708 may remove any extra header information that was inserted by the SCF 702, SFF 706, or one of the service functions 704, and send the packet out of the (S)Gi-LAN and into the P-GW/GGSN, public Internet, or another operator's network.

Turning now to IETF Network Services Headers (NSH), NSH was developed by the IETF's Service Function Chaining (SFC) working group (WG). The headers are defined in IETF, Network Working Group, Internet-Draft, Network Service Header. The NSH contains metadata and service path information. The metadata and service path information are used in the service plane to steer traffic through network services. Referring again to the example architecture depicted in FIG. 7, the NSH is inserted by the classifier (SCF 702). However, it may be inserted by another node, outside of the VAS network for example, and then delivered to the SCF 702. FIG. 8 shows an example of where the NSH is placed relative to the IP Datagram. FIG. 9 shows an example of the format of the NSH, which includes a base header 902, a service path header 904, and context headers 906. The base header 902 may include a version field, a 'C' Bit to indicate whether critical meta data is present in the NSH, a length field to indicate the total length of the NSH, a metadata type field to indicate the format of the metadata, and a next protocol field to indicate the format of the original payload. The service path header 904 may include a service path ID that is a 24 bit field that indicates the service path that should be selected for the packet, and a service index that is used to indicate the packet's location in the service path. The context headers 906 can be various formats, for instance two formats, which depend on how the metadata type field is set in the base header 902. The context header values can be of a fixed length or they may contain variable length values. For the case of variable length headers, the IETF has defined how to format the metadata and how to indicate the length of each value in the context header 906. For example, when the metadata type field indicates that metadata is variable length, it can be formatted as shown in FIG. 10.

Referring to FIG. 10, a TLV Class field 1002 describes the scope of the Type field 1004. In other words, it identifies the vendor or standards body that allocated the type field 1004. The Type field 1004 indicates the type of information that is in the meta data. The MSB of the Type field 1004 is used to indicate whether or not it is mandatory, for an entity that processes the NSH, to understand the meta data value. The illustrated R bits are reserved for future use. The Len field 1006 indicates the length of the metadata in a 4-byte word. Service aware nodes are permitted to perform header related actions such as, for example, inserting the header, removing the header, selecting the service path, updating context headers, and selecting policy based on the header contents.

The 3GPP SA2 Working Group has a work item called Flexible Mobile Service Steering (FMSS). The objective of this work item is to define service requirements to enable the 3GPP Core Network to define and modify traffic steering policies that will be used to select required service enablers of the operator deployed (S)Gi-LAN. The aim is to realize efficient and flexible mobile service steering in the (S)Gi-LAN. FIG. 11 is a representation of how the 3GPP architecture that is proposed by the FMSS would be applied to the architecture that is proposed by the IETF and is described above with reference to FIG. 7. Referring to FIG. 11, the PCRF 504, P-GW 601, and TDF 502 are standardized by 3GPP and typically owned by the MNO. The SCF 702, SFF 706, and Service Functions 704 are not currently standardized by 3GPP, but they are typically deployed in the (S)Gi-LAN and owned by the MNO.

The FMSS proposes an St Reference point (shown in FIG. 11) that allows the PCRF 504 to provide traffic steering policies to the SCF 702 in the (S)Gi-LAN. The FMSS also proposes that the Sd reference point with the TDF 502 may be used to provide traffic steering polices to the TDF 502. The TDF 502 may then be used to apply packet markings (e.g., an NSH) to the traffic based on the detected application, user, etc. The FMSS further proposes that the P-GW 601 apply packet markings (e.g., an NSH) based on polices from the PCRF 504.

It is recognized herein that current approaches to traffic steering in M2M systems lack capabilities, particularly with respect to traversing value added services in an operator's network.

SUMMARY

As described herein, nodes or apparatuses at a machine-to-machine (M2M) service layer can leverage value added services that are deployed in the telecom operator's network. For example, the M2M service layer may add metadata to downlink traffic so that the metadata can be used to assist with steering and processing data in the operator's value added services (VASs) network. By of way further example, the M2M service layer can use a control plane interface to push polices into a network operator's VASs network, and to allow functions in the VAS network to extract information from the M2M service layer. As described herein, various mechanisms can also be applied in the uplink by a device that supports a service layer and is equipped with a control plane interface to the operator's VASs network.

In one embodiment, value added services that are deployed by a network operator can obtain data and context from the M2M service layer to assist in traffic steering and to assist value added services in processing data. A service layer northbound interface, which is disclosed herein, can be used by functions in the operator's network to obtain metadata, or context, from the service layer.

In one embodiment, an apparatus connected to a network may receive a policy, context information, or other information from an M2M service layer and use it to form and provision a steering or routing policy in an edge gateway of the network, such that the edge gateway routes packets in accordance with the policy, wherein the policy indicates which value added services should be applied to the traffic. The policy may also indicate whether traffic should be routed toward a service classification function or whether traffic should bypass the service classification function. The apparatus may query a transport interworking function to determine whether the M2M service layer is authorized to steer traffic associated with a particular destination. The apparatus may query a transport interworking function to determine whether the M2M service layer is authorized to steer traffic through one or more value added services of the network. Alternatively, the apparatus may be provisioned with authorization information via operations and management procedures.

In another embodiment, an apparatus may insert metadata in downlink traffic. The metadata may be indicative of at least one of a service function chain, a security key, a security algorithm, a network type, an access statistic, a sleep schedule, a status of a user, a desired value added service, or a network condition. The apparatus may send the downlink traffic with the metadata so that value added services of the network can process the downlink traffic in accordance with the metadata. In yet another embodiment, an apparatus may provision a policy to a steering policy engine, such that downlink traffic is steered in accordance with the policy. For example, the policy may indicate that traffic from a particular service layer is processed by one or more particular value added services of the network. The policy may indicate that traffic toward a particular destination should be processed by one or more particular value added services of the network. In another example, the policy may indicate that traffic of a particular type should be processed by one or more particular value added services.

In another example embodiment described herein, an apparatus connected to a network receives a data packet, queries an M2M service layer for context information associated with the data packet, and forms a policy based on the received context information. The apparatus obtains context information associated with the data packet. Based on the context information, the apparatus forms a policy that identifies value added services of the network for processing the data packet and sends the data packet toward the identified value added services, based on the policy. Alternatively, the apparatus may send the policy to another apparatus that sends the data packet toward the identified value added services based on the policy.

In yet another example embodiment, an apparatus connected to a network receives a data packet, and queries an M2M service layer for context information associated with the data packet. The apparatus obtains context information associated with the data packet. Based on the context information, the apparatus identifies value added services of the network for processing the data packet, and sends the data packet toward the identified value added services. The data packet may be indicative of a Create, Retrieve, Update, Delete (CRUD) operation, and the query may contain an attribute or resource name from the CRUD operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
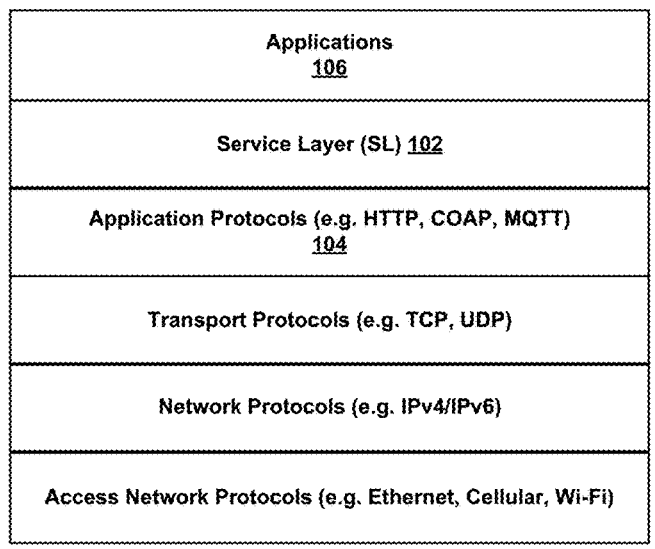
FIG. 1 depicts an example protocol stack that supports a service layer.
Figure 2:
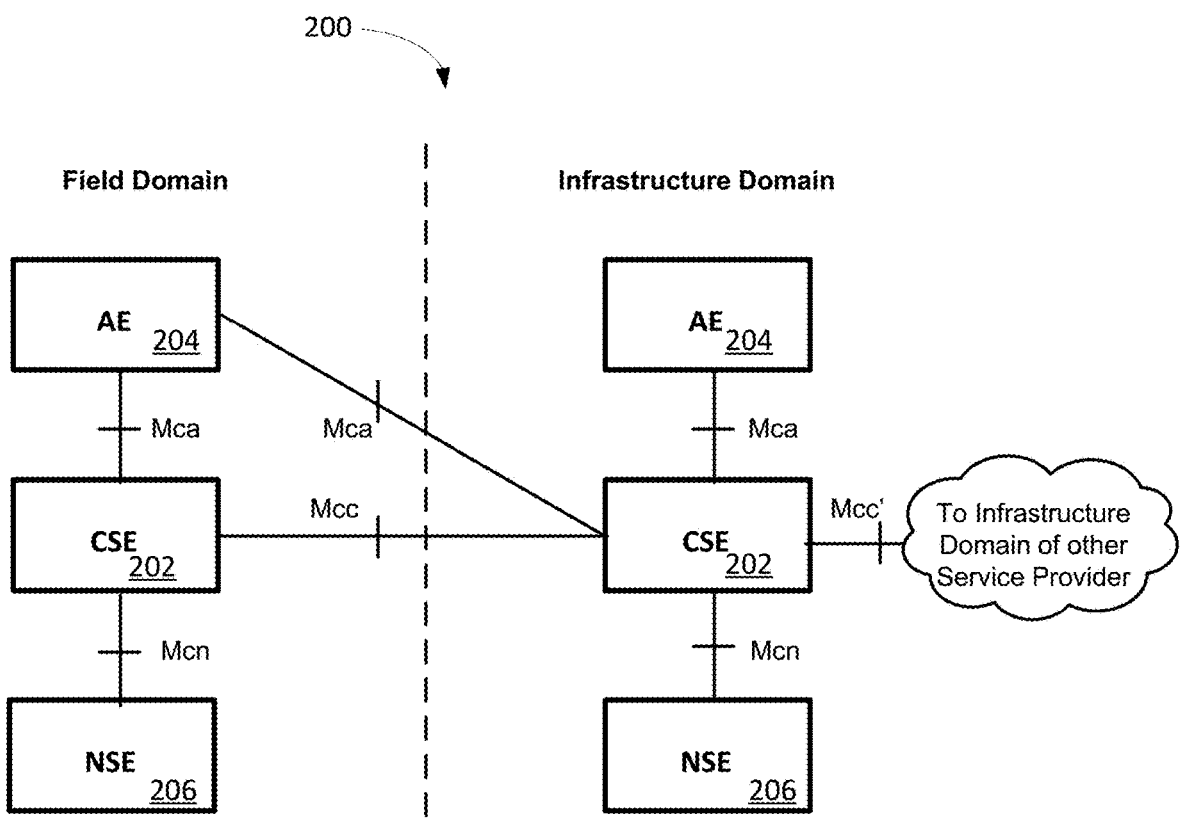
FIG. 2 is a block diagram that depicts an example of the oneM2M architecture in which embodiments described herein may be implemented.
Figure 3:
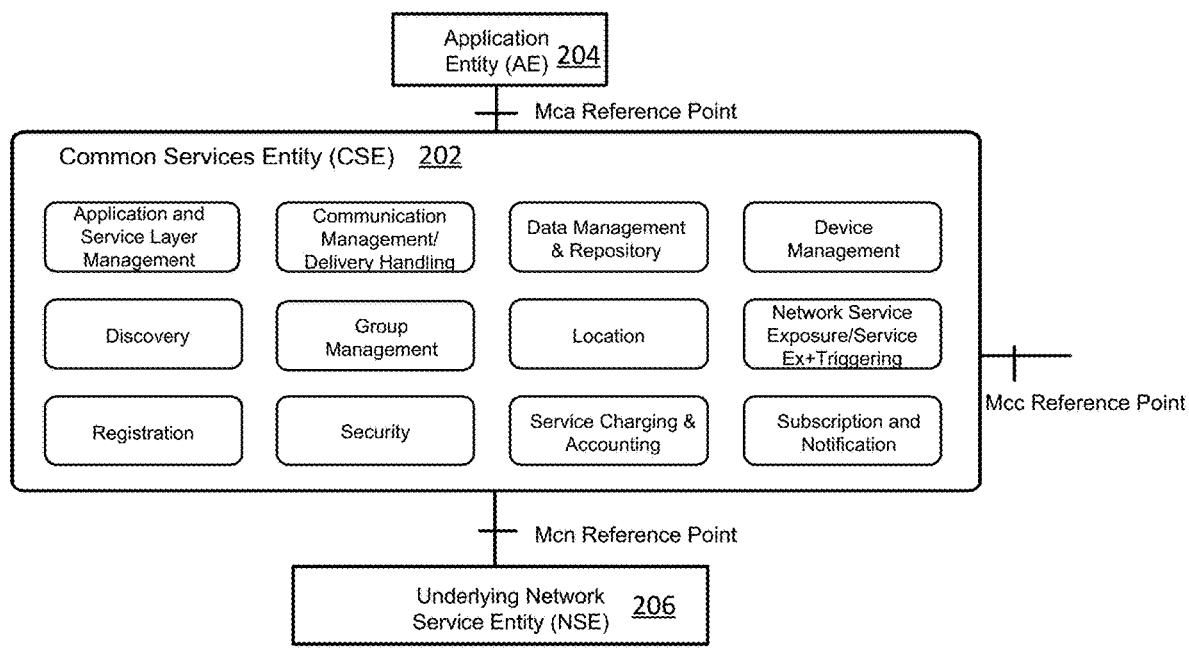
FIG. 3 is a block diagram that shows example common service function that can be included in the oneM2M architecture shown in FIG. 2.
Figure 4:
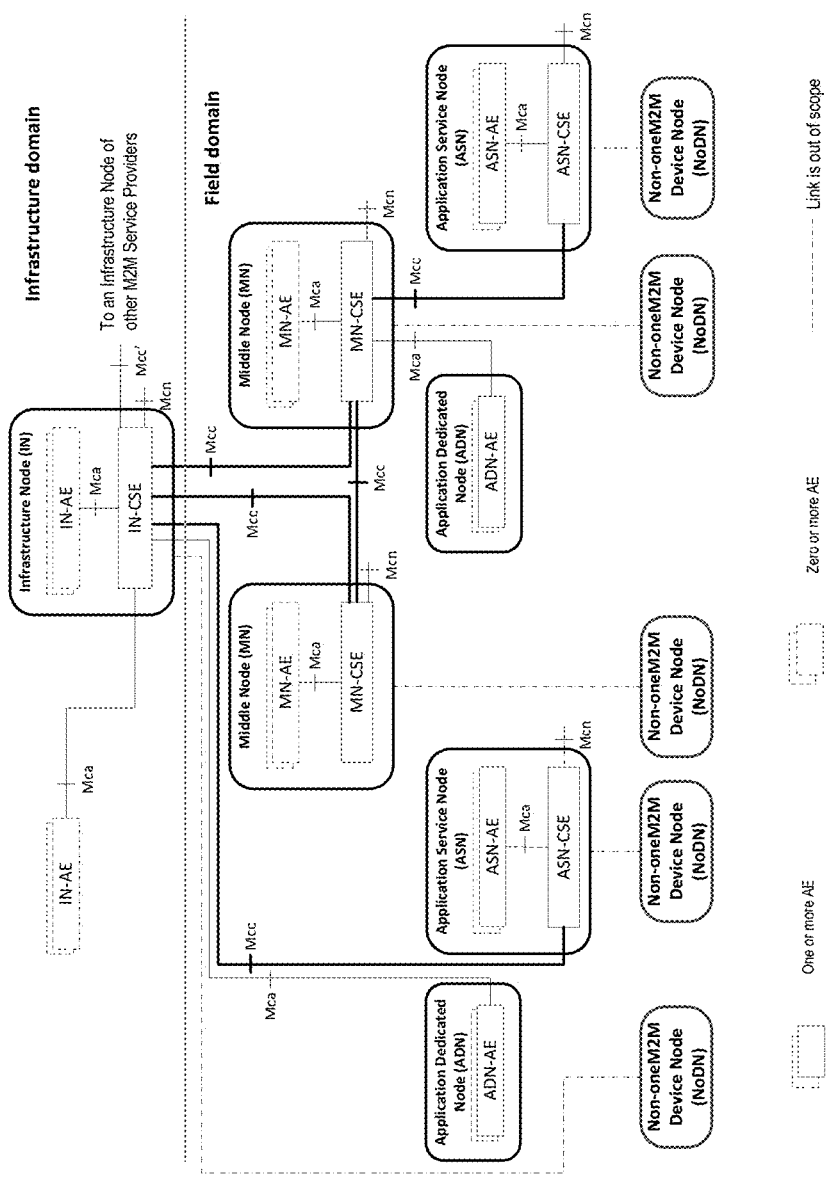
FIG. 4 is a block diagram of an example oneM2M system that includes example configurations for interconnecting nodes that are supported by the system.
Figure 5:
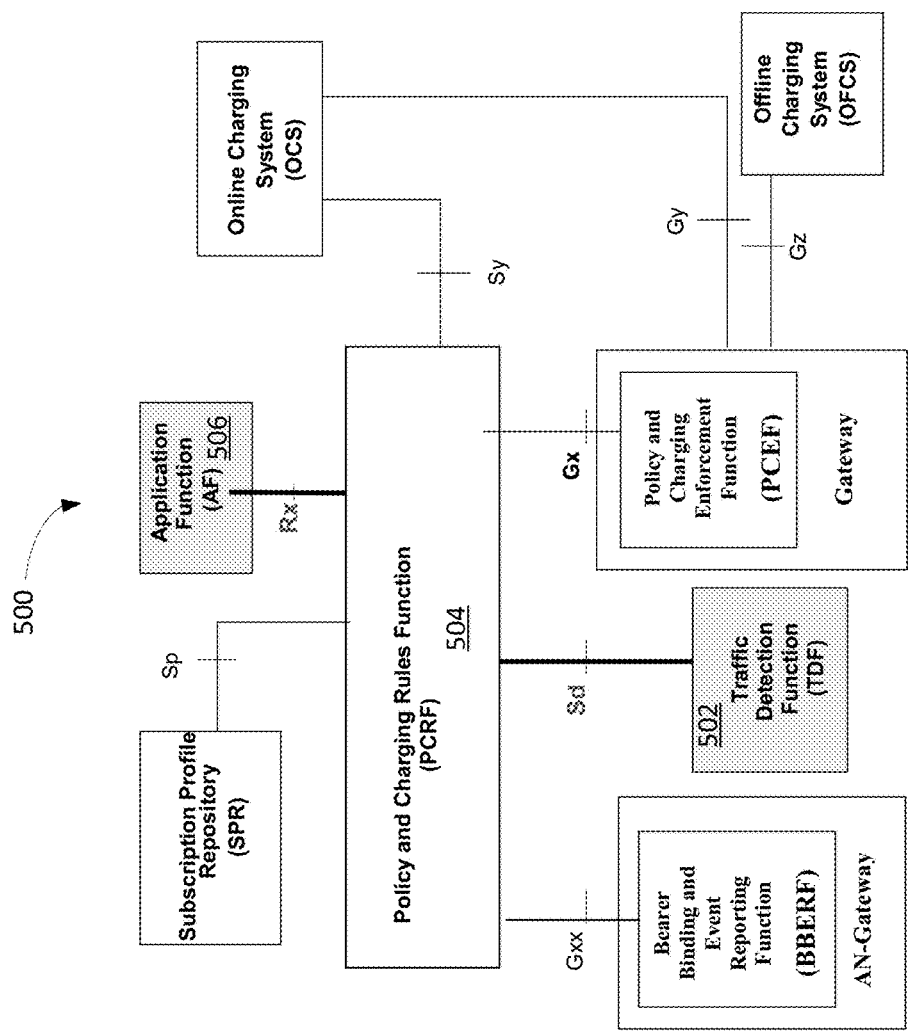
FIG. 5 is a block diagram of a Policy Control and Charging (PCC) architecture for 3GPP based networks in which various embodiments described herein may be implemented.
Figure 6:
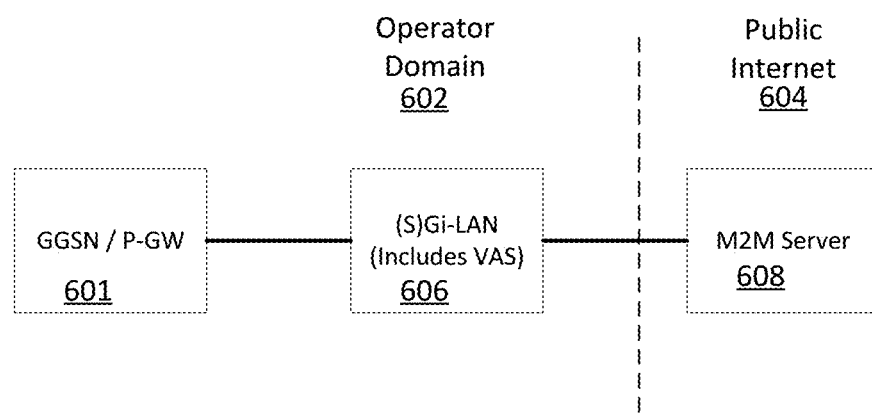
FIG. 6 is a block diagram that shows an example of where an (S)Gi-LAN resides relative to a mobile network operator (MNO) domain and the public Internet.
Figure 7:
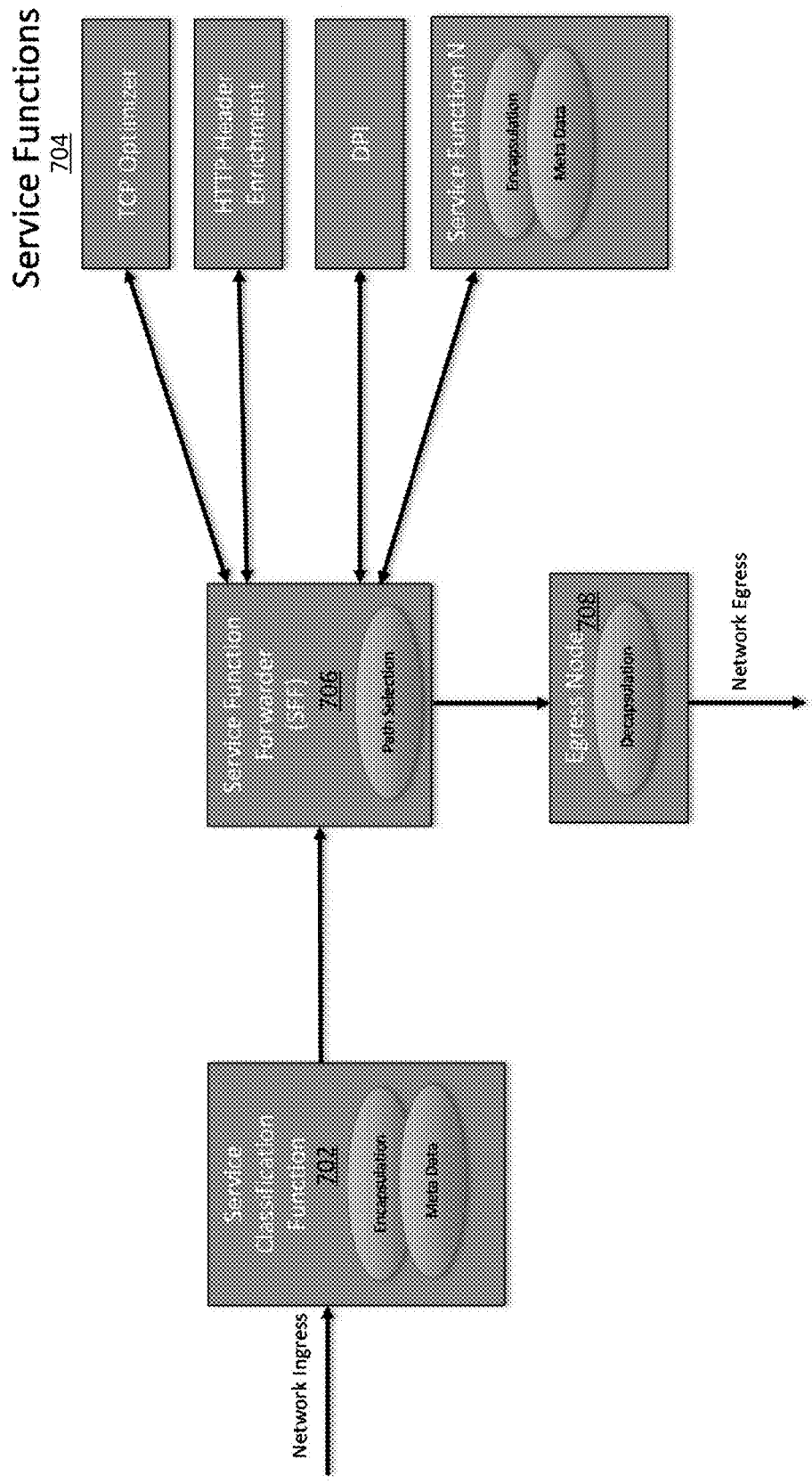
FIG. 7 is a block diagram that depicts an example of an IETF Service Function Chaining Architecture Framework.
Figure 8:
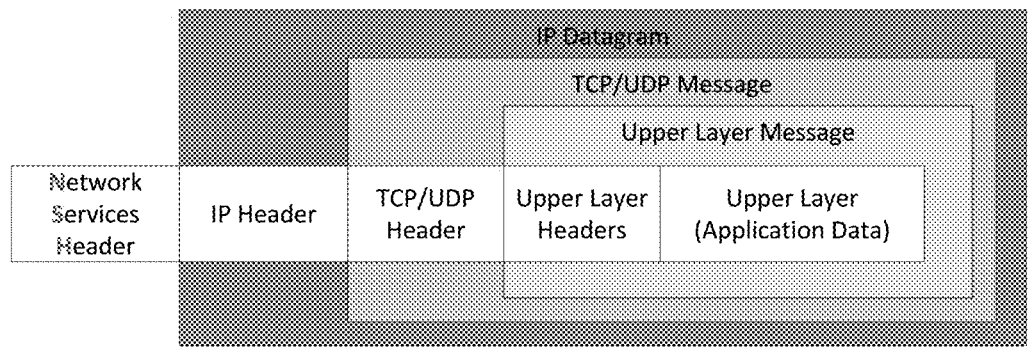
FIG. 8 depicts an example encapsulation of a Network Services Header (NSH)
Figure 9:
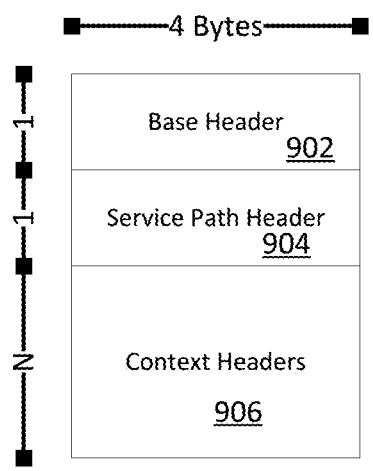
FIG. 9 depicts an example format of an NSH.
Figure 10:
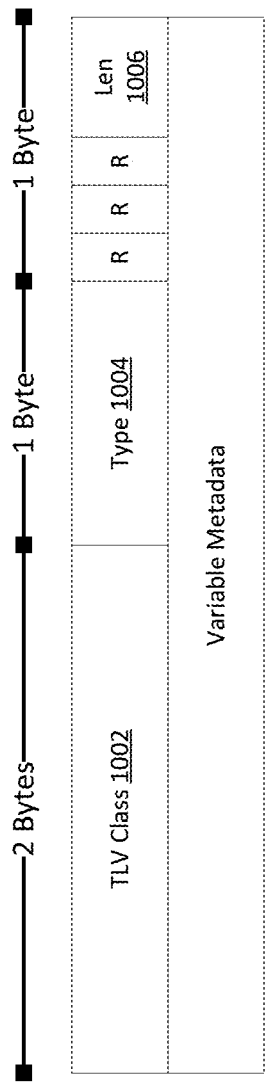
FIG. 10 depicts an example format of a context header of an NSH.
Figure 11:
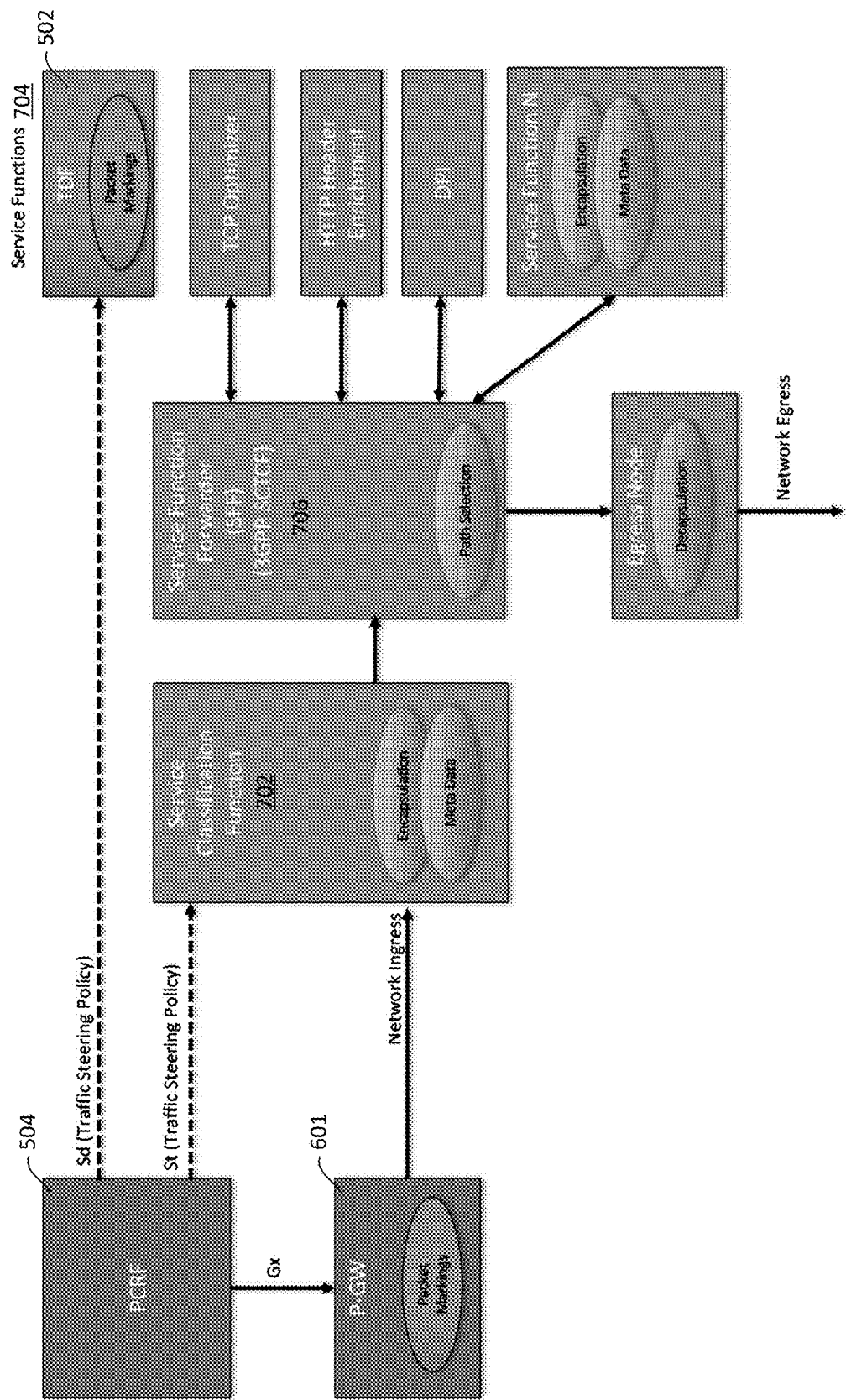
FIG. 11 is a block diagram that depicts an example of a 3GPP Flexible Mobile Service Steering (FMSS) architecture overlaid on the IETF Service Function Chaining (SFC) architecture.

As an initial matter, the Service Function and Value Added Service (VAS) can be used interchangeably herein, unless otherwise specified. Further, the Mcn (e.g., see FIGS. 1 and 2) is traditionally considered a type of service layer "southbound" interface. As used herein, a southbound interface may refer to an interface that the service layer uses to request services or data from an underlying network, and a northbound interface may be an interface that an underlying network uses to request services or data from the service layer. It should also be noted that a Service Function or Value Added Service (VAS) may also be referred to herein as a Network Function (NF), without limitation. Further, M2M Service Layer is often used herein, but, purposes of example, unless otherwise specified, the M2M Service Layer may also be referred to as IoT server, an application server (AS), an application function (AF), a common services entity (CSE), or a services capability server (SCS).

As another initial matter, a service layer generally refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Telecom and broadband operators deploy value-added services (VASs), such as firewalls, parental controls, anti-malware, DDoS protection, video processing, etc. These services exist outside of the service layer, but can be complementary to services that exist in the service layer. Currently, however, it is recognized herein that an M2M server has no control over how its traffic traverses the VASs. That is, the VAS that are deployed by an operator are not integrated with the M2M server service layer. Thus, M2M servers are not able to leverage the VASs that are offered by telecom and broadband operators.

Further, it is recognized herein that when a given value-added service (VAS) is applied to traffic that is coming from, or going to, an M2M server, the VAS is not able to take advantage of context information that is available on the M2M server. For example, a given VAS may insert advertisements in a video stream. The selected advertisement may depend on a given user's location. The video stream itself might not contain any location context information about the user, however, this information might be known by the M2M server. Currently M2M Service Layer architectures offer no means for third party VAS's to query the M2M Server for context information.

Turning now to an example use case in which a network operator may deploy a buffering service in its network, the buffering service may be used to buffer downlink traffic, such as, for example, software upgrades that are not particularly time sensitive. In the example, an M2M service layer wants to send a large software image via a cellular connection to a gateway that connects to the Internet. It is recognized herein that it may beneficial to the network operator if its VAS network could identify that the download is not time sensitive, and thus can be sent to a buffer VAS and forwarded to the target device at a later time. In an example in accordance with an embodiment, the telecom operator may then delay software downloads until times when the network is not congested.

Continuing with the example use case, the quality of service (QoS) mechanisms that are offered by the 3GPP mobile core network provide no control for long term buffering. The QoS mechanisms that are offered by the 3GPP MCN on the Rx interface allow application servers to indicate whether a flow is time tolerant or not. Currently, network operators may use this information to determine whether packets should be given priority as they are routed to/from the user. For example, a flow that is a streaming video might be given priority, and a software download might not be given priority. It is recognized herein, however, that even low priority flows are not permitted to be buffered or delayed for very long periods of time. It is further recognized herein that, if the application server can indicate to the telecom operator that a flow represents a software download, then the telecom operator may be able to buffer the download for longer periods of time (e.g., multiple hours or days) until it can be delivered to the user.

Turning now to another example use case, an advertisement VAS in the network operator's network inspects traffic and inserts advertisements in video, image, and audio downloads. It is recognized herein that it may be beneficial to the telecom operator if it could obtain user context from the M2M service layer to make more intelligent decisions concerning, for example, what advertisements to insert in the download and when to insert advertisements in the download. By way of example, in accordance with various embodiments described below, the M2M service layer may inform an advertisement service whether the user is busy or the user's location, likes, dislikes, etc. By way of further example, if the "user" is a vending machine, the M2M service layer may have meta data available to indicate that there are human "users" nearby who enjoy the type of snacks that are currently in the vending machine. The vending machine could adjust its advertising screen accordingly.

As described herein, nodes or apparatuses at a machine-to-machine (M2M) service layer can leverage value added services that are deployed in the telecom operator's network. It will be understood that that terms "telecom operator's network" or "operator's network" or "network" may be used interchangeably herein, unless otherwise specified. For example, the M2M service layer may add metadata to downlink traffic so that the metadata can be used to assist with steering and processing data in the operator's value added services (VASs) network. By way of further example, the M2M service layer can use a control plane interface to push polices into a network operator's VASs network, and to allow functions in the VASs network to extract information from the M2M service layer. As described herein, various mechanisms can also be applied in the uplink by a device that supports a service layer and is equipped with a control plane interface to the operator's VAS network.

In one embodiment, value added services that are deployed by a network operator can obtain data and context from the M2M service layer to assist in traffic steering and to assist value added services in processing data. A service layer northbound interface, which is disclosed herein, can be used by functions in the operator's network to obtain metadata, or context, from the service layer.

FIGS. 12-16 (described hereinafter) illustrate various embodiments of methods and apparatus for steering and processing traffic. In these figures, various steps or operations are shown being performed by one or more servers, gateways, functions, nodes, and/or services. It is understood that the servers, gateways, functions, and/or services illustrated in these figures may represent logical entities in a communication network and may be implemented in the form of software (e.g., computer-executable instructions) stored in a memory of, and executing on a processor of, a node or apparatus of such network, which may comprise one of the general architectures illustrated in FIG. 18B-E or 18G described below. That is, the methods illustrated in FIGS. 12-16 may be implemented in the form of software (e.g., computer-executable instructions) stored in a memory of a network node or apparatus, such as for example the node or computer apparatus illustrated in FIG. 18B or 18F, which computer executable instructions, when executed by a processor of the node or apparatus, perform the steps illustrated in the figures. It is also understood that any transmitting and receiving steps illustrated in these figures may be performed by communication circuitry (e.g., circuitry 122 or 97 of FIGS. 18A and 18F, respectively) of the node or apparatus under control of the processor of the node or apparatus and the computer-executable instructions (e.g., software) that it executes.

Figure 12:
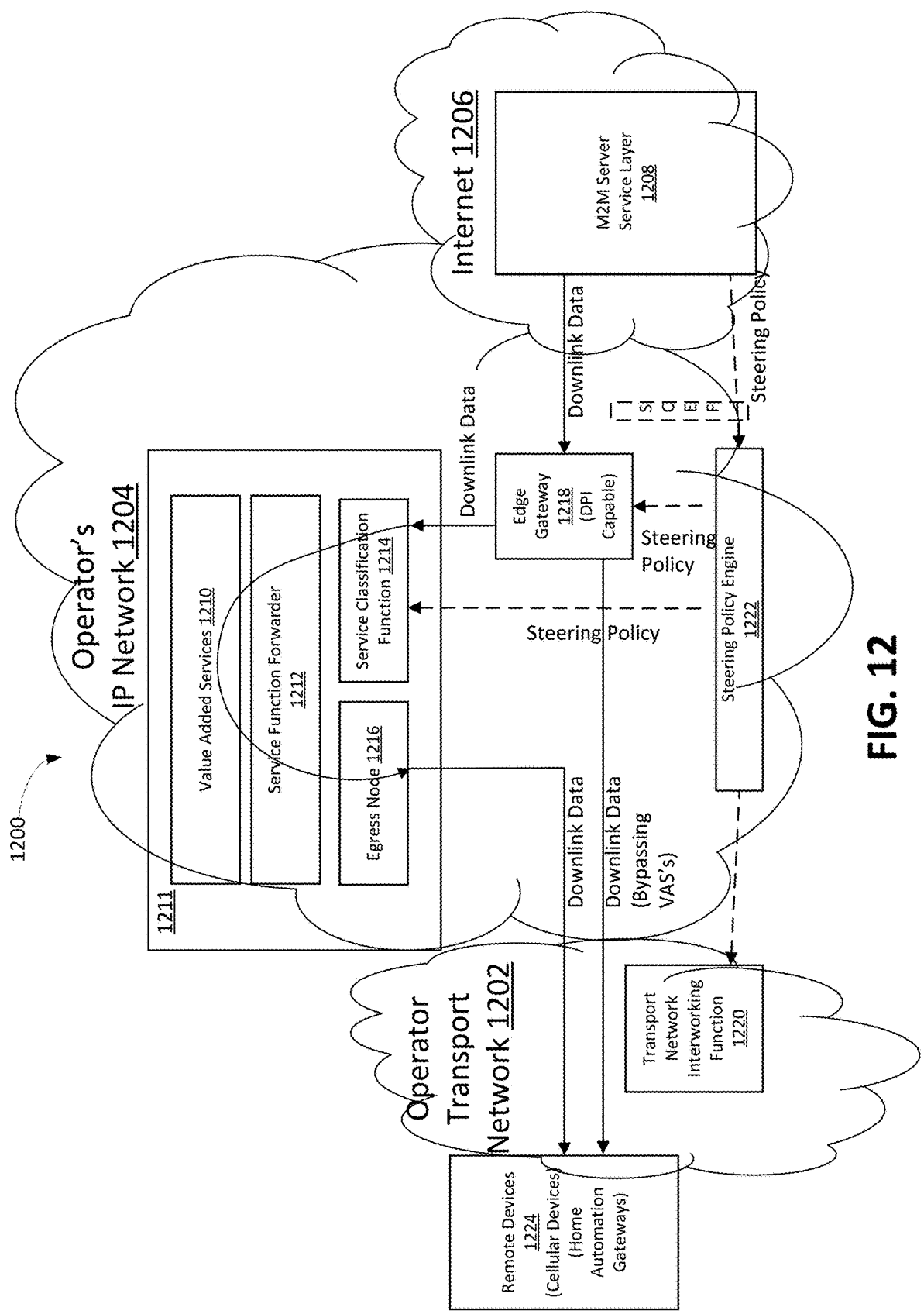
FIG. 12 is a block diagram that illustrates downlink traffic steering via a southbound interface in accordance with an example embodiment.

Referring now to FIG. 12, an example system 1200 includes the operator's network that includes an operator transport network 1202 and an operator IP network 1204, and the Internet 1206. As shown, an M2M server service layer 1208 resides on the Internet 1206. The M2M server service layer 1208 may also be referred to, for simplicity, as an M2M server or the M2M service layer, without limitation. The IP network 1204 may include value added services (VASs) 1210, a service function forwarder (SFF) 1212, a service classification function (SCF) 1214, and an egress node 1216. As described further below, the M2M server service layer 1208 can steer downlink traffic or data through the VASs 1210 that are deployed by the network operator. It will be appreciated that the example system 1200 in FIG. 12 and the systems illustrated in FIGS. 13-16 are simplified to facilitate description of the disclosed subject matter and is not intended to limit the scope of this disclosure. Other devices, systems, and configurations may be used to implement the embodiments disclosed herein in addition to, or instead of, a system such as the systems shown in FIGS. 12-16, and all such embodiments are contemplated as within the scope of the present disclosure.

It will be understood that while embodiments are described herein that involve the M2M service layer adding metadata to downlink traffic so that the metadata can be used to assist with steering and processing the data in the operator's VASs network, embodiments are not limited to downlink traffic. Disclosed concepts may also be applied in the uplink by a device that is sending data toward the M2M service layer. Other embodiments described in detail below involve the M2M service layer using a control plane interface to push polices into the Network Operator's VAS network and to allow the function in the Operator's VAS network to extract information from the M2M Service Layer. These ideas can also be applied in the uplink by a device that supports a service layer and is equipped with a control plane interface to the operator's VAS network.

Referring again to FIG. 12, the IP network 1204 further includes an edge gateway 1218. As used herein, an edge gateway, for instance the edge gateway 1218, refers to a gateway at the edge of the operator's IP network 1204. The edge gateway 1218 may determine whether traffic should enter or bypass the value added services 1210 or a value added services network 1211, which may include the VASs 1210, service classification function 1214, service function forwarder 1212, and egress node 1216. Because the edge gateway 1218 can process user plane traffic, it may also include (or be) a User Plane Function (UPF) or a logical function within the UPF. As shown, the transport network 1202 may include a transport network interworking function 1220. As used herein, a transport network interworking function, for instance the illustrated transport network interworking function 1220, refers to a function in the underlying transport network that is used to exchange control plane information with the functions that are outside of the transport network 1202. Because the transport network interworking function 1220 can be used to expose the services and capabilities of the mobile core network, it may include (or be referred to as) a network exposure function (NEF). As also shown in the example system 1200, the IP network 1204 also includes a steering policy engine 1222. As used herein, a steering policy engine, for instance the illustrated steering policy engine 1222, refers to a function that accepts steering polices from a service layer or application server, and pushes the polices to the underlying transport network (e.g., transport network 1202) and/or VAS network (e.g., VAS network 1211). Because the steering policy engine can control polices, it may include (or also be referred to as) a policy control function (PCF).

As described in detail below, the M2M service layer 1208 may utilize more than one method to steer downlink traffic through the operator's value added services 1210. In one embodiment, the M2M service layer 1208 can use a southbound interface to preconfigure the operator's network with policies that can be used to determine how traffic should be routed through the VASs 1210. In another embodiment described in detail below, the M2M service layer can wrap packets in a network services header and send the traffic directly to the operator's service classification function 1214. In yet another embodiment, the M2M service layer 1208 can structure its data such that the operator can use deep packet inspection (DPI) to detect which VASs 1210 should be applied to the data. It will be understood that the embodiments mentioned above might not be mutually exclusive. For example, the M2M service layer 1208 can wrap packets in a network services header and send the traffic directly to the operator's service classification function (SCF) 1214. Once data is sent to the SCF 1214, the SCF 1214 can inspect the data for any embedded metadata that may have been placed there by the M2M service layer 1208 in order to influence how traffic is steered. Preconfigured policies can also be used to influence traffic steering.

Referring in particular to FIG. 12, in an example embodiment, downlink traffic is steered via southbound interface. In accordance with the illustrated example, the M2M service layer 1208 uses a southbound control interface to provide traffic steering policies to the policy engine 1222 in the operator's network. As shown, the system 1200 includes the steering policy engine 1222 that can accept polices from the M2M service layer 1208, and the steering policy engine 1222 can use the polices to configure the edge gateway 1218 and the SCF 1214. The steering policy engine can also be implemented by, and thus referred to as, a Policy Decision Point (PDP). The edge gateway 1218 and the SCF 1214 can also be implemented by, and thus referred to as a, policy enforcement point (PEP). The policies may be used by the edge gateway 1218 in the operator's IP network 1204 to determine whether each downlink packet should be routed toward the service classification function (SCF) 1214 or directly toward one or more remote devices 1224 (e.g., cellular devices, home automation gateways, etc) via the transport network 1202. Once a packet enters the SCF 1214, the policies may be used to determine which VASs 1210 (and/or which network functions) should process the data and in what order the VASs 1210 (and/or network functions) should process the data.

Figure 13:
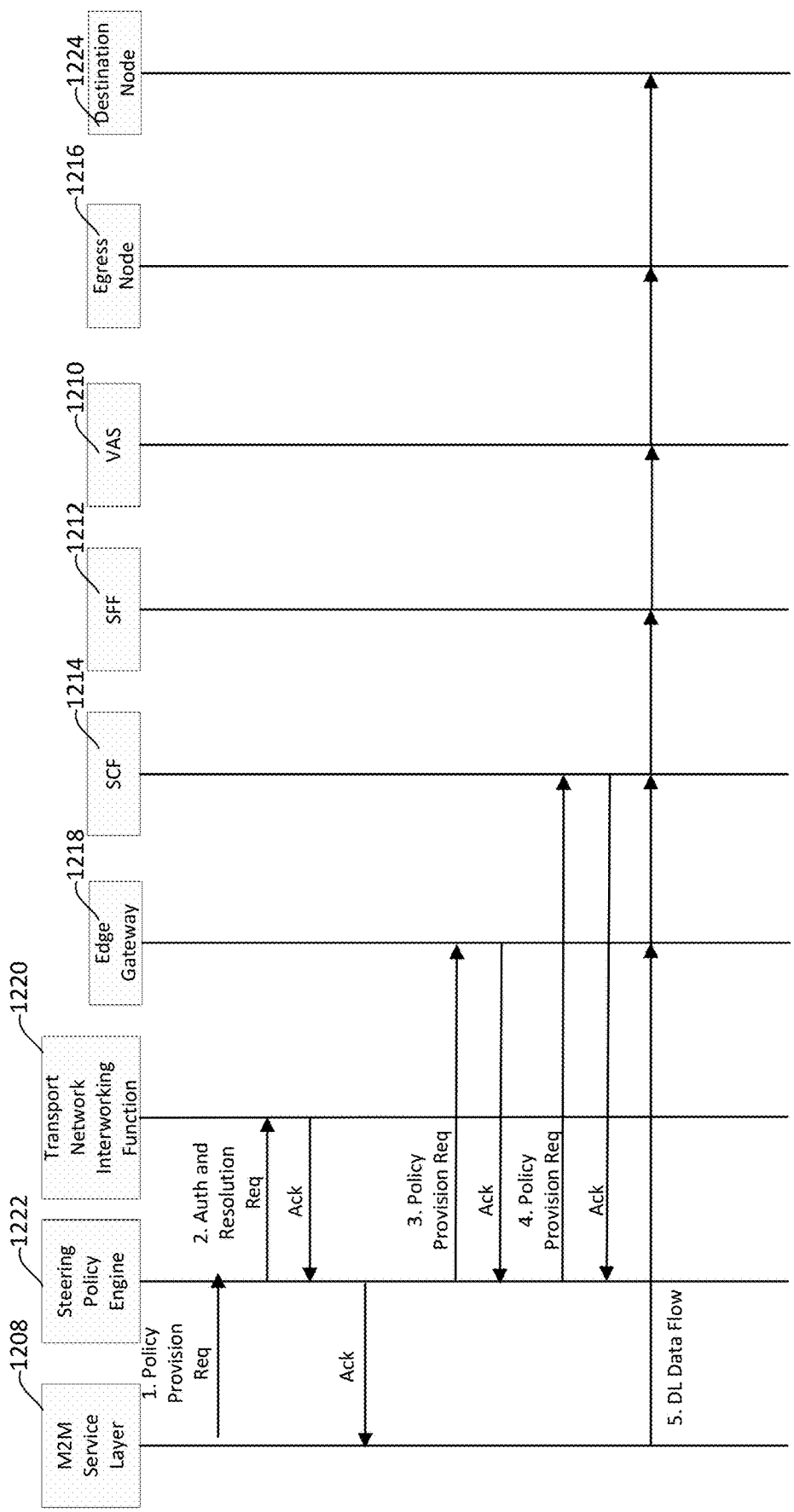
FIG. 13 is a call flow that illustrates policy provisioning via the southbound interface in accordance with an example embodiment.

Referring now to FIG. 13, an example call flow is depicted that can be performed within the system 1200. For example, at 1, in accordance with the illustrated embodiment, the M2M service layer (SL) 1208 provisions a policy to the steering policy engine 1222 of the operator's IP network 1204. In some cases, the communication between the SL 1208 and the steering policy engine 1222 is not direct. For example, such communication may traverse an exposure function, such as the SCEF or NEF. The policy may be associated with any attributes of traffic as desired. For example, a given policy may apply to all traffic that comes from the SL 1208, to a particular destination or source of the traffic, to a particular type of traffic, to traffic associated with a particular time of day, to a particular network load, to traffic associated with a certain VAS cost, or the like. By way of further example, the policy provision request at 1 may indicate that traffic from a particular SL should be processed by a particular set of one or more of the VASs 1210. Continuing with the example, the SL may be identified by its IP address or SL identifier. In some cases, when the SL identifier is used, the edge gateway 1218 may be expected to use DPI to identify the source of traffic.

In another example, the policy provision request at 1 may indicate that traffic toward a particular destination should be processed by a particular set of one or more of the VASs 1210. In accordance with the illustrated example, the destination is depicted as a destination node 1226, which may be one of the remote devices 1224 shown in FIG. 12. For example, the SL 1208 may identify the destination by its IP Address, SL identifier (e.g., CSE-ID or AE-ID), SL Session ID, or Transport Network Identifier. In some cases, when the SL identifier is used, the edge gateway 1218 may be expected to use DPI to identify the destination of traffic. In some cases, when the transport network identifier is used, the steering policy engine 1222 may be expected to resolve the transport network identifier by querying the transport network interworking function 1220.

In yet another example, the policy provision request at 1 may indicate that traffic of a particular type should be processed by a particular set of one or more of the VASs 1210. The traffic type may refer to a particular transport protocol (e.g., UDP or TCP), a particular service layer protocol (e.g., ETSI M2M or oneM2M), or a particular application level protocol (e.g., HTTP or CoAP). The request may further indicate that the VASs that are used should depend on the data itself. For example, in some cases in which RESTful communication is used, the SL may indicate that the selected VASs should depend on the attributes that are associated with the resource that is being addressed. By way of further example, attributes that are associated with the resource may explicitly name the VASs that should process the request. The attributes that are associated with the data may also explicitly indicate the order, or sequence, in which the VASs should process the data. The VASs that are applied may also depend on the type of CRUD operation (e.g., Retrieve, Update, etc.).

Data from the SL 1208 may be encrypted and/or integrity protected. The request (at 1) from the SL 1208 may include security keys that the VASs 1210, SFF 1212, SCF 1214, and/or egress node 1216 may use to decrypt the traffic before processing and re-encrypt the traffic before sending it toward the destination. Alternatively, a given VAS may be configured to perform security functions on the data (e.g., encryption or decryption). In some cases, for example, a UE may encrypt the data, a VAS may encrypt or decrypt the data for the M2M server 1208 (or before it reaches the M2M Server 1208), or a VAS may encrypt or decrypt data for the M2M server 1208 before the data is sent to the UE. As mentioned above, in some cases, the communication between the M2M service layer and steering policy engine is not direct. Thus, in an example, a policy can be received from the M2M service layer via a service capability exposure function or a network exposure function.

Still referring to FIG. 13, at 2, in accordance with the illustrated embodiment, the steering policy engine 1222 queries the transport network interworking function 1220 (e.g., using an authorization request) to check that the SL 1208 is authorized to steer traffic that is associated with a particular destination, and to check that the SL 1208 is permitted to steer traffic through the selected VASs. The authorization request sent at 2 may include the SL identifier and optionally the destination of the traffic and the VASs that are requested. Thus, querying the transport interworking function may include sending an authorization request to the transport interworking function, and the authorization request may include at least one of an identifier of the M2M service layer, the destination of the traffic, or the one or more value added services that are requested to be applied to the traffic. As shown, the transport network interworking function 1220 may send an acknowledgement (ACK) to indicate whether the request (at 2) is authorized. The ACK may also indicate the IP address of the destination node 1226. For example, if the request indicated that the destination was a particular FQDN (e.g., 3GPP external Identifier), then the transport network interworking function 1220 may provide the IP address that is associated with that FQDN. In some cases, the IP address can then be used in steps 3 and 4 described below to provision steering rules in the edge gateway 1218 and SCF 1214.

At 3, in accordance with the illustrated embodiment, the steering policy engine 122 provisions a policy in the edge gateway 1218. The policies that are provisioned in the edge gateway 1218 may be used by the edge gateway 1218 to determine which packets should be routed toward the SCF 1214 and which packets do not require VASs 1210, and thus should bypass the SCF 1214 and be forwarded to the operator's transport network 1202. The policies that are sent to the edge gateway 1218 may be formatted as desired. Some example formats are now discussed.

In some cases, the policy may be an IP Address/Port Number Quadruple. For example, a given policy can consist of the source and destination IP addresses and port numbers of a traffic flow. In some cases, the policy may indicate that traffic, for instance all traffic, associated with the flow should be routed towards the SCF 1214 (or not routed towards the SCF). The policy may indicate that traffic of a certain type should be routed towards the SCF 1214. For example, the policy may indicate that routing decisions should be based on the transport layer protocols that are used (e.g., UDP, TCP, etc.). Alternatively, or additionally, the policy may indicate that routing decisions should be based on the application layer protocol that is in use (e.g., HTTP, CoAP, etc.). Alternatively still, or additionally, the policy may indicate that routing decisions should be based on the service layer protocols that are used (e.g., ETSI M2M, oneM2M, etc.). In some cases, the policy may be more detailed. By way of example, if the traffic is associated with RESTful communications or particular CRUD operation types, then the policy may indicate that the attributes of the addressed resource should be inspected to determine if it should be sent toward the SCF 1214.

By way of further example, a given policy may be based on both an IP Address/Port Number Quadruple and the traffic type. For example, the policy may indicate that traffic, for instance all traffic, that is of a particular type and that is associated with a particular IP flow should be sent towards the SCF 1214. In some cases, a given policy may be based on service layer identifiers, such as the source or destination SL identifiers (e.g., ADN-CSE, MN-CSE, IN-CSE), application identifiers, and SL session identifiers. In another example, the policy at 3 is based on the addressed resource (e.g., URI based). As shown, the edge gateway 1218 may acknowledge the new policy.

Still referring to FIG. 13, in accordance with the illustrated example, at 4, the steering policy engine 1222 provisions a policy in the SCF 1214. The policies that are provisioned in the SCF 1214 may be used by the SCF 1214 to determine which VASs 1210 should process each flow, and the order in which the VASs 1210 should process each flow. The policies that are sent to the SCF 1214 may be formatted as desired. Some example formats are now discussed.

In some cases, the policy may be an IP Address/Port Number Quadruple. For example, a given policy can consist of the source and destination IP addresses and port numbers of a traffic flow. The policy may indicate that traffic, for instance all traffic, associated with the flow should be processed by particular VASs 1210 and in a particular order. In some cases, the policy may indicate that traffic, for instance all traffic, associated with the flow should be routed towards the SCF 1214 (or not routed towards the SFC). The policy may indicate that traffic of a certain type should be routed towards the SCF 1214. For example, the policy may indicate that routing decisions should be based on the transport layer protocols that are used (e.g., UDP, TCP, etc.). Alternatively, or additionally, the policy may indicate that routing decisions should be based on the application layer protocol that is in use (e.g., HTTP, CoAP, etc.). Alternatively still, or additionally, the policy may indicate that routing decisions should be based on the service layer protocols that are used (e.g., ETSI M2M, oneM2M, etc.). In some cases, the policy may be more detailed. By way of example, if the traffic is associated with RESTful communications or particular CRUD operation types, then the policy may indicate that the attributes of the addressed resource should be inspected to determine if it should be sent toward the SCF 1214.

By way of further example, a given policy may be based on both an IP Address/Port Number Quadruple and the traffic type. For example, the policy may indicate that traffic, for instance all traffic, that is of a particular type and that is associated with a particular IP flow should be processed by particular VASs 1210 and in a particular order. In some cases, a given policy provided to the SCF 1214 may be based on service layer identifiers, such as the source or destination SL identifiers (e.g., ADN-CSE, MN-CSE, IN-CSE), application identifiers, and SL session identifiers. In another example, the policy at 4 is based on the addressed resource (e.g., URI based). As shown, the SCF 1214 may acknowledge the new policy.

In an alternative embodiment, the edge gateway 1218 may configure the SCF 1214 with polices, or the edge gateway 1218 may be integrated with the SCF 1214.

At 5, in accordance with the illustrated example, the SL 1208 may begin to send downlink data toward the devices 1224 in the transport network 1202. The edge gateway 1218 may use the policy that was provisioned at 3 to determine whether the traffic should be redirected and processed by the VASs 1210. The SCF 1214 may use the policy that was provisioned at 4 to determine which VASs 1210 should process the data and in what order. The SCF 1214 may then send the packet and a selected service function chain (e.g., the list of services and the order in which these services should be applied) to the SFF 1212. The SFF 1212 may manage sequencing the data packets through the VASs 1210 and return the result to the egress node 1216 so that it can be sent toward the transport network 1202.

As mentioned above, in accordance with an embodiment, a given service layer may wrap downlink traffic with a network services header (NSH). The SL may provide a service path ID in the NSH to indicate the select VASs that should process the data, and the order that the select VASs should process the data. In some cases, the service layer may have been pre-provisioned with information about which VASs are available to process the downlink traffic.

The SL can populate the context header portion of the NSH with metadata that can be used to steer traffic through the VASs. The metadata can also be used by the VASs when processing the data. For example, the SL can provide security keys and/or identify an encryption/decryption mechanism that can be used to decrypt the data before processing and/or encrypt the data after processing.

In some example cases, the application or service layer payload may be encrypted and the VASs might not be permitted to read the payload but attributes associated with the RESTful resource(s) in the payload may be required to properly steer traffic. In cases such as this example, the SL may place unencrypted copies of the required attributes in the context header section of the NSH, in accordance with an example embodiment.

Table 1 below shows values that may be placed in the NSH context header. It will be understood that additional, or alternative, values may be placed in the NSH context header as desired.

TABLE 1

Example Context Header Attributes

| Example MetaData | Description |
| --- | --- |
| Service Function Chain | The service function chain can explicitly be placed in the context header. The service function chain explicitly indicates which value added services should process the packet and the order in which the services should be applied. |
| Security Keys | Security Keys that are used to decrypt the data before processing and/or encrypt the data after processing. In some cases, the keys themselves may be encrypted or sent to the VAS network via a separate secure channel. |
| Security Algorithms | A list of which security (encryption/decryption) algorithms should be used. Alternatively, a security key derivation procedure. |
| Network Type | The type of network (e.g., Cellular, 3GPP, Wi-Fi,) that is used by the target device. |
| Access Statistics | Access statistics that are related to the addressed resource, a parent resource, or a child resource. This information may be used, for example, by a caching VAS to determine if the data should be cached and for how long the data should be cached. |
| Sleep Schedule | The sleep schedule of the addressed device. This information may be used, for example, by a caching VAS to determine if the data should be cached and for how long the data should be cached. |
| User Status | The status of the target device's user (e.g., busy, out of office, driving, working, etc.). This information can be used to determine which types of advertisements should be inserted in |

TABLE 1-continued

Example Context Header Attributes

| Example MetaData | Description |
| --- | --- |
| | a flow or whether a software download should be buffered in a VAS until a later time. |
| Network Conditions | The network conditions may be used by VASs to determine if traffic should be blocked, compressed, re-encoded, encrypted, buffered, or cached. |

Still referring generally to FIG. 12, the service layer 1208 may embed information in data plane traffic so that it can be detected by a DPI engine (e.g., the edge gateway 1218) in the operator's network. In some cases, the same metadata can be used by the VASs 1210 and SCF 1214 when processing and steering traffic. This approach may be similar to the NSH approach that is described above in the sense that both approaches use metadata that is embedded in the data plane traffic. In this example, however, no separate header is wrapped around the data. Instead, a DPI engine detects the application or service layer protocol that is being used and then locates and interprets the metadata that is embedded in the data plane packet. The values that are listed in Table 1 above are also examples of values that may be embedded as metadata in the user plane traffic.

Figure 14:
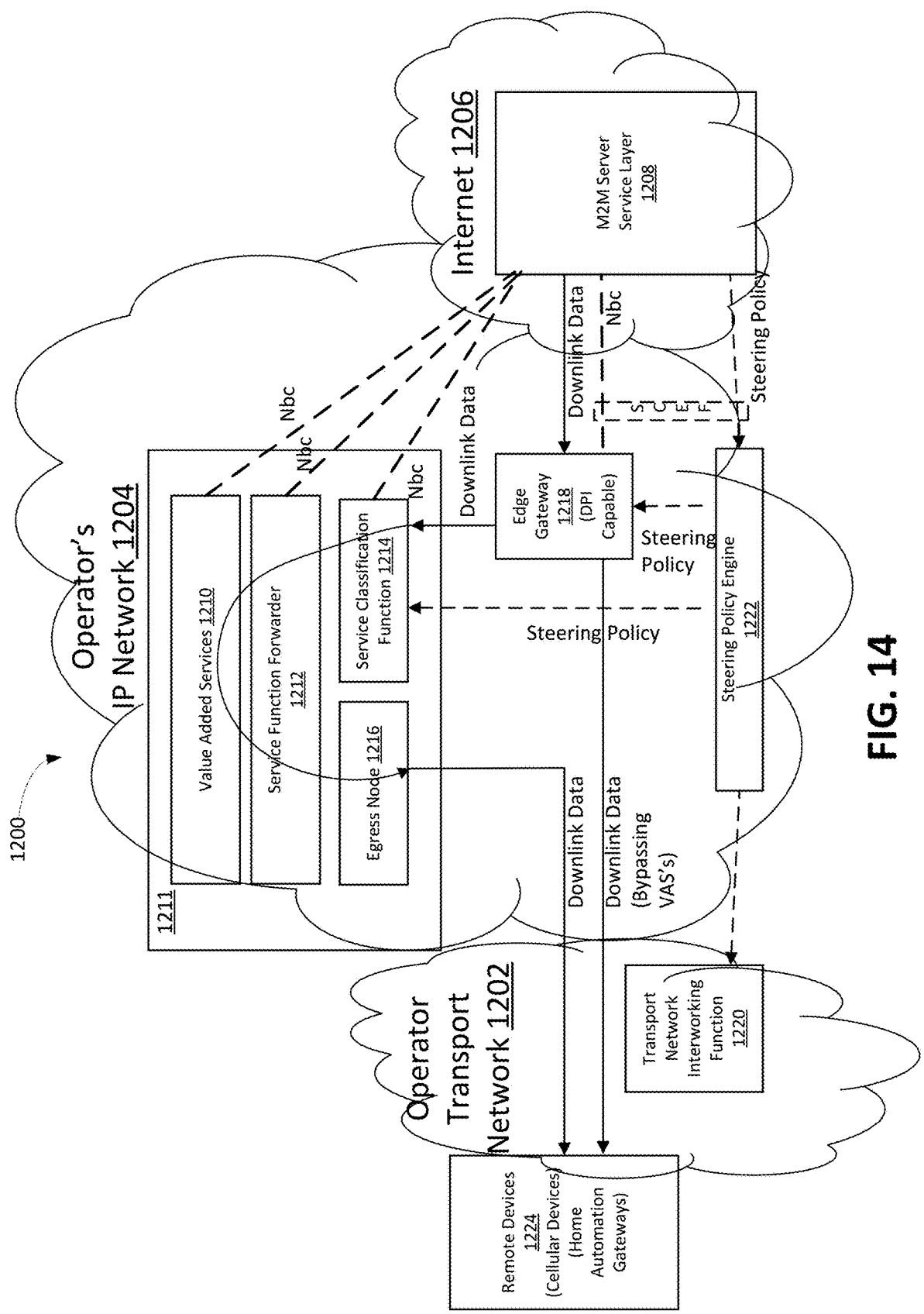
FIG. 14 is a block diagram that illustrates traffic steering via a northbound interface in accordance with an example embodiment.

Referring now to FIG. 14, steering assistance via a northbound interface is now described. As shown, functions in the operator's value added services network 1211 may have interfaces to the M2M service layer 1208. These interfaces can be referred to herein as M2M service layer northbound interfaces or northbound context (Nbc) interfaces. These interfaces can be used to obtain context information from the M2M service layer 1208 to determine how traffic should be steered through the value added services (VASs) 1210, and how the services themselves should process the data that is steered to them.

As shown in FIG. 14, northbound context interfaces are disposed between functions in the operator's network and the M2M service layer 1208. For example, an Nbc interface between the edge gateway 1218 and the M2M SL 1208 can be used by the edge gateway 1218 to query the M2M SL 1208 for further information concerning a given traffic flow to determine, for example, whether the flow should be routed towards the SCF 1214. An Nbc interface between the SCF 1214 (or SFF 1212) and the M2M SL 1208 can be used by the SCF 1214 or SFF 1212 to query the M2M SL 1208 for further information associated with a traffic flow to determine which VASs 1210 should process the traffic and in what order the services should process the traffic. An Nbc interface between a given VAS and the M2M SL 1208 can be used by the VAS to query the M2M SL 1208 for further information concerning a given traffic flow to help the VAS process the traffic. In some cases, the Nbc interfaces might not connect directly to the M2M Service Layer. For example, they be routed via an SCEF or NEF, where the SCEF or NEF can hide the underlying details of the Nbc interfaces, and can expose an API to the M2M Service Layer. Thus, the M2M service layer can be queried for context information associated with a received data packet, the context information can be obtained in response to the query. Further, in some cases, querying the M2M service layer includes sending a query to a service capability exposure function or a network exposure function.

Turning now to an example in which the service layer is based on oneM2M, and operator's transport network is a 3GPP-based core network (e.g., EPC), though it will be understood that embodiments are not limited as such, as described above, a SL can steer downlink traffic via a southbound interface. In an embodiment, the service layer may be a oneM2M IN-CSE. The IN-CSE may use a oneM2M Mcn interface to send steering policies to the steering policy engine. The Mcn interface may be based on the 3GPP Sd and St interfaces. The Sd and St Interfaces are diameter based interfaces that are described in detail in 3GPP TR 23.718. An SCEF may sit between the steering policy engine 1222 and M2M service layer 1208 that is shown in FIG. 12. The steering policy engine 1222 may be a 3GPP PCRF or PCF. The SCEF is defined in 3GPP TS 23.682.

Continuing with the example, the edge gateway 1218 may be a 3GPP TDF and the interface between the edge gateway 1218 and the steering policy engine 1222 may be based on the Sd interface. The Sd interface may be used to send polices to the TDF, which are used by the TDF to classify packets. For example, the policies may be used to classify which packets should go to the SCF 1214 so that they may be processed by the VASs 1210. The policies may also be used to classify which packets should be forwarded directly towards a device, and thus bypass the VASs 1210. In some cases, the SCF 1214 may be a 3GPP Service Chain Traffic Controller Function (SCTCF). The interface between the SCF 1214 and the steering policy engine 1222 may be based on the St Interface. The St Interface may be used to send polices to the SCF 1214 that are used by the SCF 1214 to steer packets through the VASs 1210. It will be understood that the edge gateway 1218 (e.g., TDF) and SCF 1214 (e.g., SCTCF) functionalities may be integrated with each other.

As described above, the steering policy engine 1222 may query the transport network interworking function 1220 to determine whether the IN-CSE is authorized to request that the traffic is steered and to access the requested services. This query may also be used to resolve the target device's identifier to an IP address. In such a 3GPP/oneM2M embodiment, the transport network interworking function 1220 may be implemented by, and thus may be, for example, a 3GPP NEF, UDM, AUSF, SCEF, HSS, UDR, UDR Front End Interface, AAA Server, MTC-IWF, or a DNS server.

A given policy from the service layer 1208 may indicate that resources with certain attributes should be steered in a particular manner. For example, and without limitation, a given policy may indicate that a certain requestReachability, resourceType, resourceID, resourceName, parentID, labels, or accessControlPolicyIDs should be steered in a particular manner. In some cases, the policy may be dependent on the underlying network that is being addressed and policies that are stored in a cmdhPolicy resource. The southbound interface may start at the CMDH CSF, and the CMDH CSF may use the southbound interface to configure the VASs 1210 according to the underlying network that is being used by a given target device. For example, a change to the activeCmdhPolicy, cmdhNwAccessRule, cmdhNetworkAccessRules, or other resources may trigger the CMDH CSF to send a new policy to the steering policy engine 1222.

Turning now to lawful intercept as a service (LIAAS), an operator of the service layer 1208 may be subject to laws that require it to provide lawful intercept (LI) infrastructure to proper authorities. The architecture shown in FIG. 12 may be used to subject traffic to LI. For example, a oneM2M SL can use the Mcn interface to indicate that traffic, for instance all traffic, that is associated with a particular user, source, or destination should be routed through a VAS that performs the lawful intercept function. The architecture described with reference to FIG. 12 may thus enable the service layer operator to leverage LI services from a third party or the legal authority itself.

With respect to downlink traffic steering via metadata and DPI, a RESTful service layer architecture, such as oneM2M for example, may embed metadata in the attributes of a resource so that a DPI engine can easily locate the presence of the metadata and determine how the traffic should be further processed.

The oneM2M specification (TS-0001, oneM2M Functional Architecture V2.0.12) describes universal and common attributes that are associated with resources. A universal attribute is associated with all resources and a common attribute is associated with many resources. In one example, new common or universal attributes may be added to the oneM2M attribute list to carry the metadata that is listed in Table 1 above. Alternatively, in another example, the existing "labels" universal attribute can be used to indicate which VASs should process the associated resource. The labels attribute can carry the values that are listed in Table 1 above in accordance with an example embodiment.

When a given VAS processes data and modifies the service layer payload, it may be required to update the lastModifiedTime attribute on the modified resource. A steering policy may indicate that resources with attributes that have certain resourceType, resourceID, resourceName, parentID, labels, or accessControlPolicyIDs should be steered in a particular manner. In some cases, when a given VAS processes the data and modifies the service layer payload, it may be required to increment the stateTag attribute on the modified resource. Alternatively, the service layer may insert the metadata into existing header fields of various protocols such as, for example and without limitation, OpenFlow, CoAP, HTTP, and MQTT, so that the information can be used for traffic steering. Alternatively still, various protocols such as, for example, OpenFlow, CoAP, HTTP, and MQTT, may be updated to carry the metadata (e.g., from Table 1) in header fields so that the information can be used for traffic steering.

Figure 15:
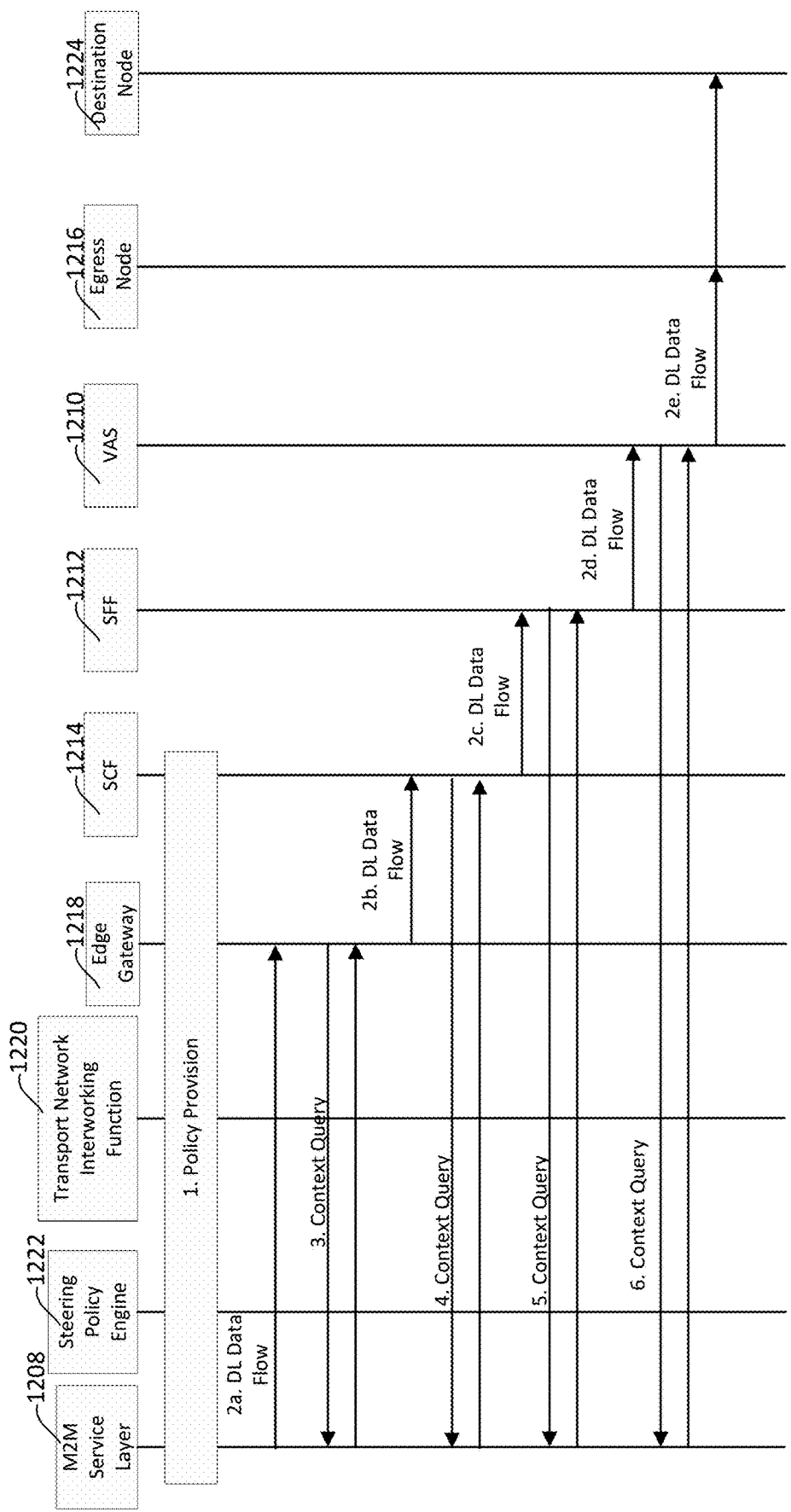
FIG. 15 is a call flow that illustrates steering assistance via the northbound interface in accordance with an example embodiment.

Referring generally to FIG. 15, an example of steering via a northbound interface between the operator's value added services network and the M2M service layer is shown. In an example oneM2M embodiment, the functions in the operator's value added services may be considered oneM2M CSE's and the Nbc interface may be an enhanced Mcc. The Mcc interface can be enhanced to allow a CSE (e.g., a VAS) to query another CSE (e.g., IN-CSE) for more information concerning a resource. For example, a VAS can query the IN-CSE to request attributes that are associated with a parent (or child) resource in order to determine how a data packet should be processed. For example, the VAS may obtain the parentID of a resource for a first message and use the Nbc interface to obtain more information about the parent in order to determine how to process the first message. For example, the VAS may wish to know various attributes such as, for example, the m2mServiceSubscriptionProfile, serviceSubscribedAppRule, group, or the like, that are associated with the parent. It will be understood that the oneM2M resources and attributes that are mentioned herein are defined in one M2M TS 0001.

In some cases in which the Nbc interface is based on Mcc, the IN-CSE can leverage the VAS by sending data directly to the VAS for processing and obtaining a result, rather than relying on the operator's network to steer the traffic to the VAS.

Referring in particular to FIG. 15, an example call flow shows that the edge gateway 1218, SCF 1214, SFF 1212, and VASs 1210 may use a northbound interface to query the M2M service layer for context information 1208 that can be used to assist with processing downlink data. At 1, in accordance with the illustrated example, the M2M service layer (SL) 1210 uses the southbound interface to provision steering policies in the telecom operator's VAS network 1211. A procedure such as one that is described above with reference to FIG. 13 can be used to provision steering policies. At 2a, the M2M service layer 1210 begins to send data to a downlink device (e.g., a sensor application or video display that is hosted on a UE). At 3, when data arrives at the edge gateway 1218, provisioned polices and DPI are used to determine that more information is needed to determine how to handle the packet. Specifically, in accordance with the example, the edge gateway 1218 needs more information to determine whether the packet should be forwarded to the SCF 1214 or whether it should bypass the VAS network 1211. The edge gateway 1218 may send a context query to M2M service layer 1208. The context query may include a specific resource name for which the edge gateway 1218 would like more information. Alternatively, the request may be a resource read that is addressed to a resource. For example, the resource read may be addressed to the parentID that is associated with the resource that is addressed at 2a. The reply from the M2M service layer 1208 may include the requested context information or the contents of the request resource. In some cases, the communication between the Edge GW and M2M Server Layer might not be direct. For example, messages between the Edge GW and M2M Server Layer may traverse the SCEF or NEF.

Still referring to FIG. 15, in accordance with the illustrated embodiment, at 4, when data arrives at the SCF 1214, provisioned polices and DPI are used to determine that more information is needed to determine how to handle the packet. Specifically, the SCF 1214 may need more information to determine which of the VASs 1210 should process the packet. The SCF 1214 may send a context query to the M2M service layer 1208. The context query may include a specific resource name for which the SCF 1214 would like more information. Alternatively, the request may be a resource read that is addressed to a resource. For example, it may be addressed to the parentID that is associated with the resource that is addressed in the message at 2b. The reply from the M2M service 1208 may include the requested context information or the contents of the request resource. Alternatively still, the SCF 1214 can explicitly request which of the VASs 1210 should process the packet, and the M2M service layer 1208 may reply with the identities of the VASs 1210 that should process the packet.

At 5, in accordance with the illustrated example, when data arrives at the SFF 1212, provisioned polices and DPI are used to determine that more information is needed to determine how to handle the packet. Specifically, in accordance with the example, the SFF 1212 needs more information to determine which of the VASs 1210 should process the packet. The SFF 1212 may send a context query to the M2M service layer 1208. The context query may include a specific resource name for which the SFF 1212 would like more information. Alternatively, the request may be a resource read that is addressed to a resource. For example, it may be addressed to the parentID that is associated with the resource that is addressed in 2c. The reply from the M2M service 1208 may include the requested context information or the contents of the request resource. Alternatively, the SFF 1212 can explicitly request which of the VASs 1210 should process the packet, and the M2M service layer 1208 may reply with the identities of the VASs 1210 that should process the packet.

At 6, when data arrives at a given VAS 1210, provisioned polices and DPI are used to determine that more information is needed to determine how to handle the packet. In accordance with the illustrated example, the VAS 1210 sends a context query to the M2M service layer 1208. The VAS 1210 may know the address of the M2M SL 1208 from the source address of the IP packet. The context query may include a specific resource name for which the VAS 1210 would like more information. Alternatively, the request may be a resource read addressed to a resource. For example, it may be addressed to the parentID that is associated with the resource that is addressed in 2d. The reply from the M2M service layer 1208 may include the requested context information or the contents of the request resource. Alternatively, the VAS 1210 can explicitly request attributes that are associated with the traffic destination.

Figure 16:
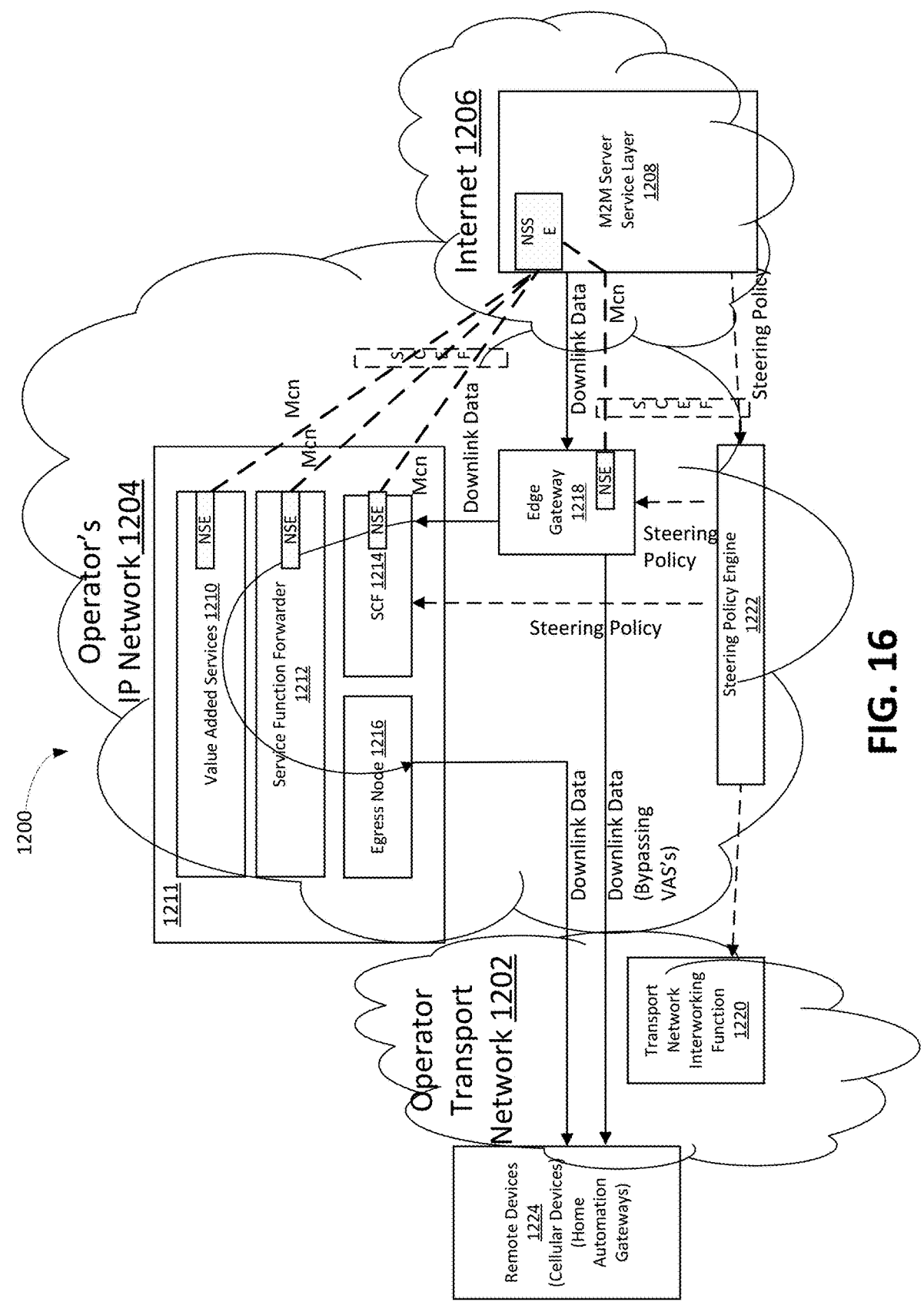
FIG. 16 is block diagram that shows an example oneM2M architecture that is enhanced to include the northbound interface depicted in FIGS. 14 and 15, in accordance with an example embodiment.

In an alternative embodiment, the Nbc interface might not be based on the Mcc reference point. Instead, a given VAS may be considered a non-oneM2M function that interfaces to the M2M via a oneM2M Mcn interface. An example of this architecture is illustrated in FIG. 16. The existing oneM2M architecture includes an NSSE CSF in the IN-CSE interfacing to NSEs in an underlying network. In the existing oneM2M architecture, the NSE is providing services to the IN-CSE. In an example embodiment disclosed herein, the IN-CSE is providing services to the NSE. As shown, the NSE may be required to process some select data packets or traffic flows. Further, the NSE uses the Nbc interface to obtain information from the IN-CSE. The information from the IN-CSE may assist the NSE in providing the service.

Figure 17:
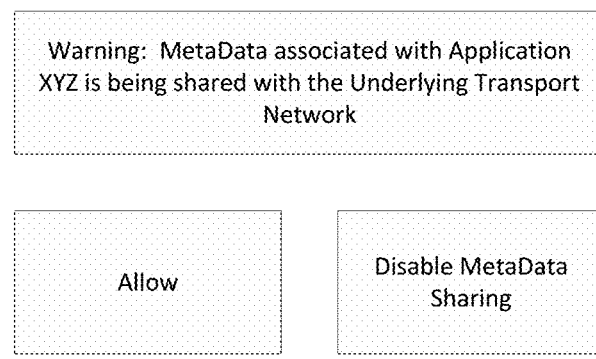
FIG. 17 is an example graphical user interface (GUI) that may be rendered by a user equipment (UE) in accordance with an example embodiment.

Referring now to FIG. 17, an example graphical user interface is shown. In an example, the M2M service layer, which may be hosted on an M2M server, M2M gateway, or an M2M device, may send a message to an application to indicate to the application when data that is associated with the application is being (or may be) shared with an underlying network. This message/indication can be used to request that the application grant the service layer permission to share the information with the underlying network. The service layer may share the information via a control plane (e.g., northbound or southbound interface) with the underlying network, or the service layer may share the information with the underlying network by inserting the metadata information into the user plane (IP) traffic. FIG. 17 shows an example GUI message that an application might display to the user after receiving a request from the service layer to share metadata with the underlying transport network. As shown, the GUI may allow the user to allow metadata sharing or disable metadata sharing. It will be understood that the above example of monitoring metadata is not exhaustive, and a user may make other determinations or verifications using the GUI as desired. Thus, it will be further understood that the GUIs can provide a user with various information in which the user is interested via a variety of charts or alternative visual depictions. In practice, other settings and parameters can be selected and displayed, as desired.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Thus, as described above, an apparatus may comprise a processor, a memory, and communication circuitry. The apparatus may be connected to a network via its communication circuitry. The apparatus may further comprise computer-executable instructions stored in the memory of the apparatus which, when executed by the processor of the apparatus, cause the apparatus to perform operations. In one embodiment, the apparatus may receive a policy from an M2M service layer and provision the policy in an edge gateway of the network, such that the edge gateway routes packets in accordance with the policy, wherein the policy indicates value added services should be applied to the traffic. The policy may alternatively, or additionally, indicate whether traffic should be routed toward a service classification function or whether traffic should bypass the service classification function. As also described above, the apparatus may query a transport interworking function to determine whether the M2M service layer is authorized to steer traffic associated with a particular destination. The apparatus may query a transport interworking function to determine whether the M2M service layer is authorized to steer traffic through one or more value added services of the network.

In another embodiment, as described above, an apparatus may insert metadata in downlink traffic. The metadata may be indicative of at least one of a service function chain, a security key, a security algorithm, a network type, an access statistic, a sleep schedule, a status of a user, or a network condition. The apparatus may send the downlink traffic with the metadata so that value added services of the network can process the downlink traffic in accordance with the metadata. In yet another embodiment, as also described above, an apparatus may provision a policy to a steering policy engine, such that downlink traffic is steered in accordance with the policy. For example, the policy may indicate that traffic from a particular service layer is processed by one or more particular value added services of the network. The policy may indicate that traffic toward a particular destination should be processed by one or more particular value added services of the network. In another example, the policy may indicate that traffic of a particular type should be processed by one or more particular value added services.

In another example embodiment described above, an apparatus connected to a network receives a data packet, and queries an M2M service layer for context information associated with the data packet. The apparatus obtains context information associated with the data packet. Based on the context information, the apparatus identifies value added services of the network for processing the data packet, and sends the data packet toward the identified value added services. The data packet may be indicative of a Create, Retrieve, Update, Delete (CRUD) operation, and the query may contain an attribute or resource name from the CRUD operation.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 18A:
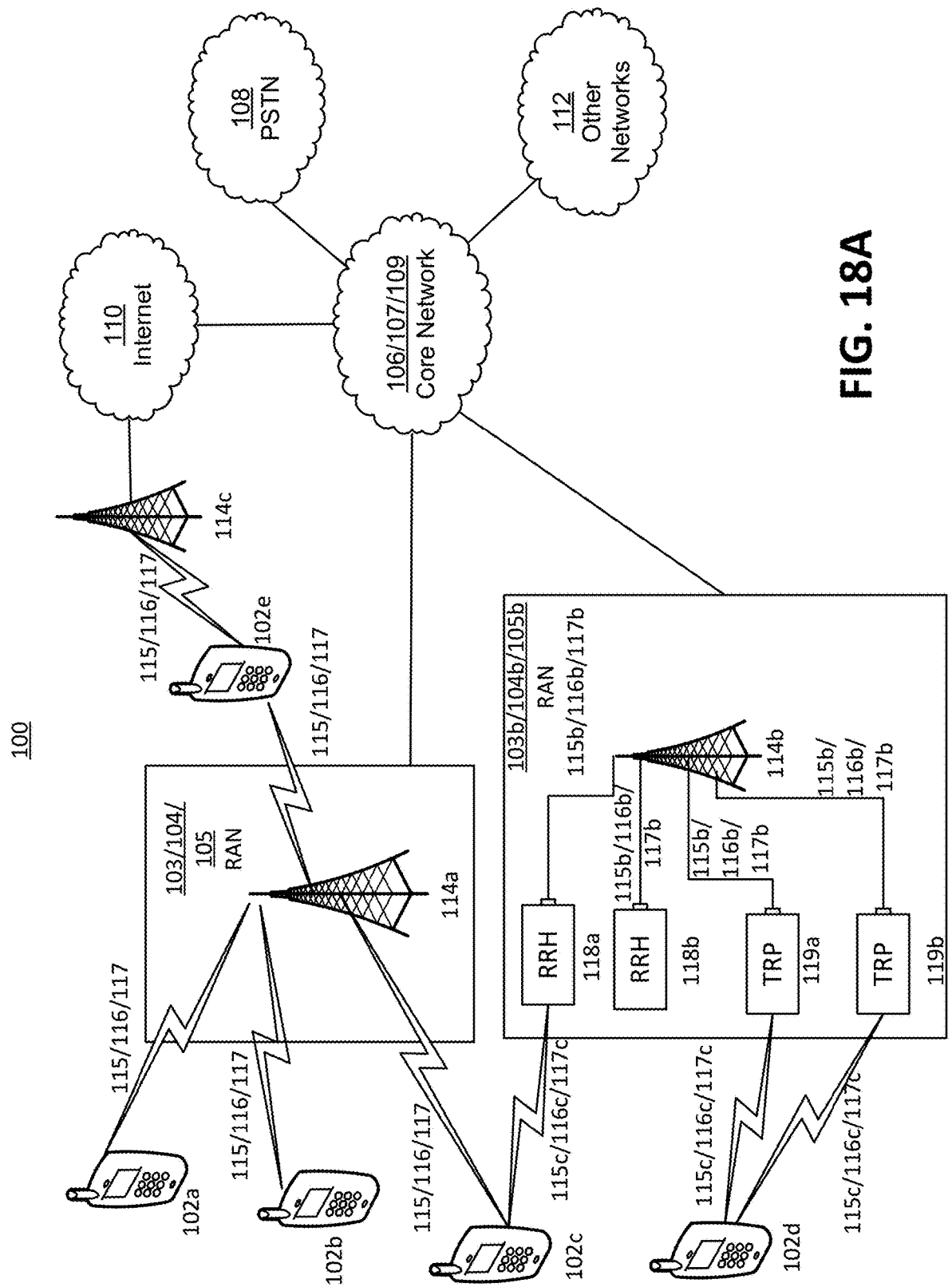
FIG. 18A illustrates one embodiment of an example communications system in which the methods and apparatuses described and claimed herein may be embodied.

FIG. 18A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 18A-18E and 18G as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 18A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 18A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 18A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 18A may be configured to communicate with the base station 114a, which may employ a cellular-based radio technology, and with the base station 114c, which may employ an IEEE 802 radio technology.

Figure 18B:
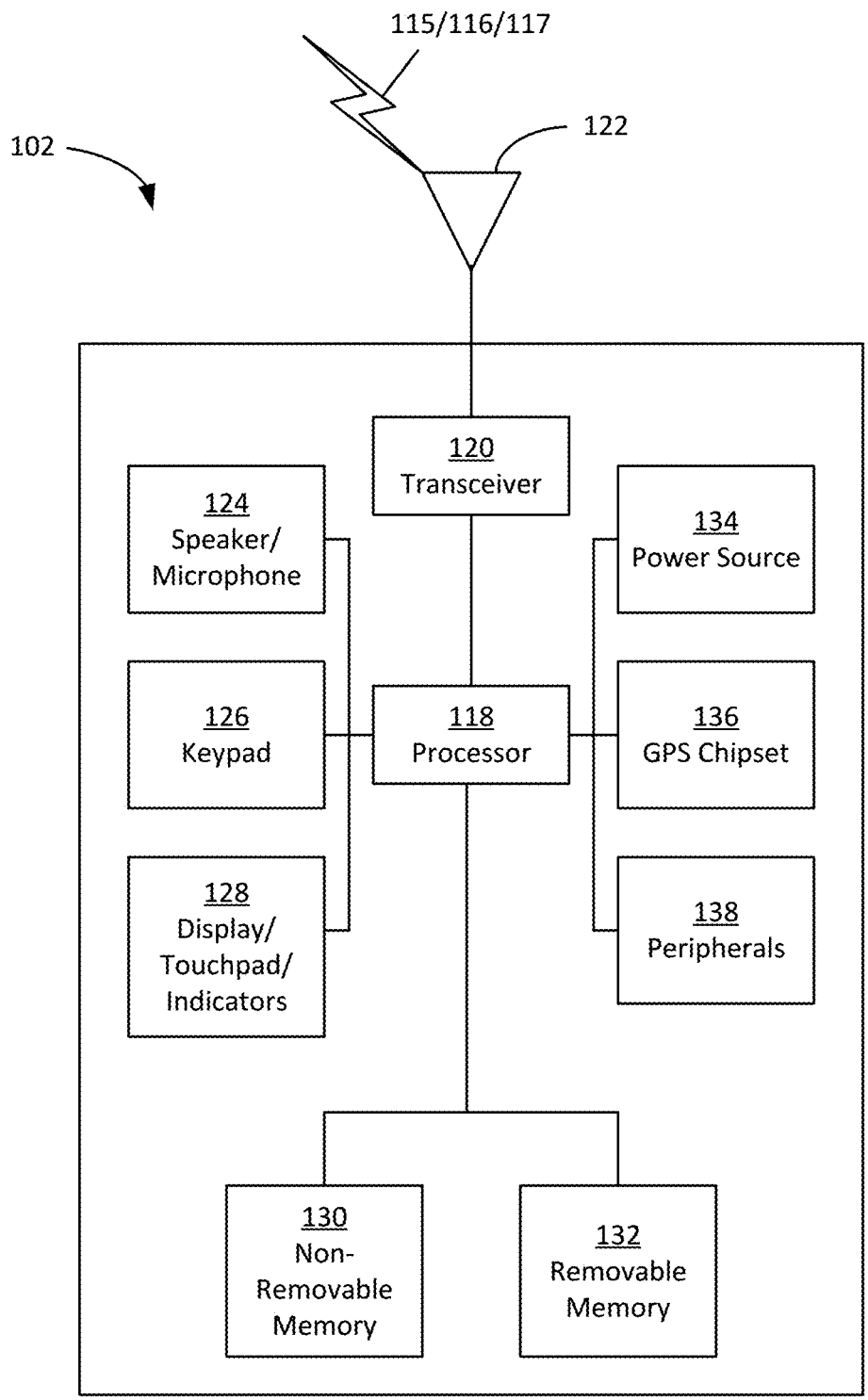
FIG. 18B is a block diagram of an example apparatus or device configured for wireless communications in accordance with the embodiments illustrated herein.

FIG. 18B is a block diagram of an example apparatus or device configured for wireless communications in accordance with the embodiments illustrated herein, such as for example, a WTRU 102. As shown in FIG. 18B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 18B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 18A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 18A may be configured to communicate with the base station 114a, which may employ a cellular-based radio technology, and with the base station 114b, which may employ an IEEE 802 radio technology.

FIG. 18B is a block diagram of an example apparatus or device configured for wireless communications in accordance with the embodiments illustrated herein, such as for example, a WTRU 102. As shown in FIG. 18B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 18B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 18B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 18C:
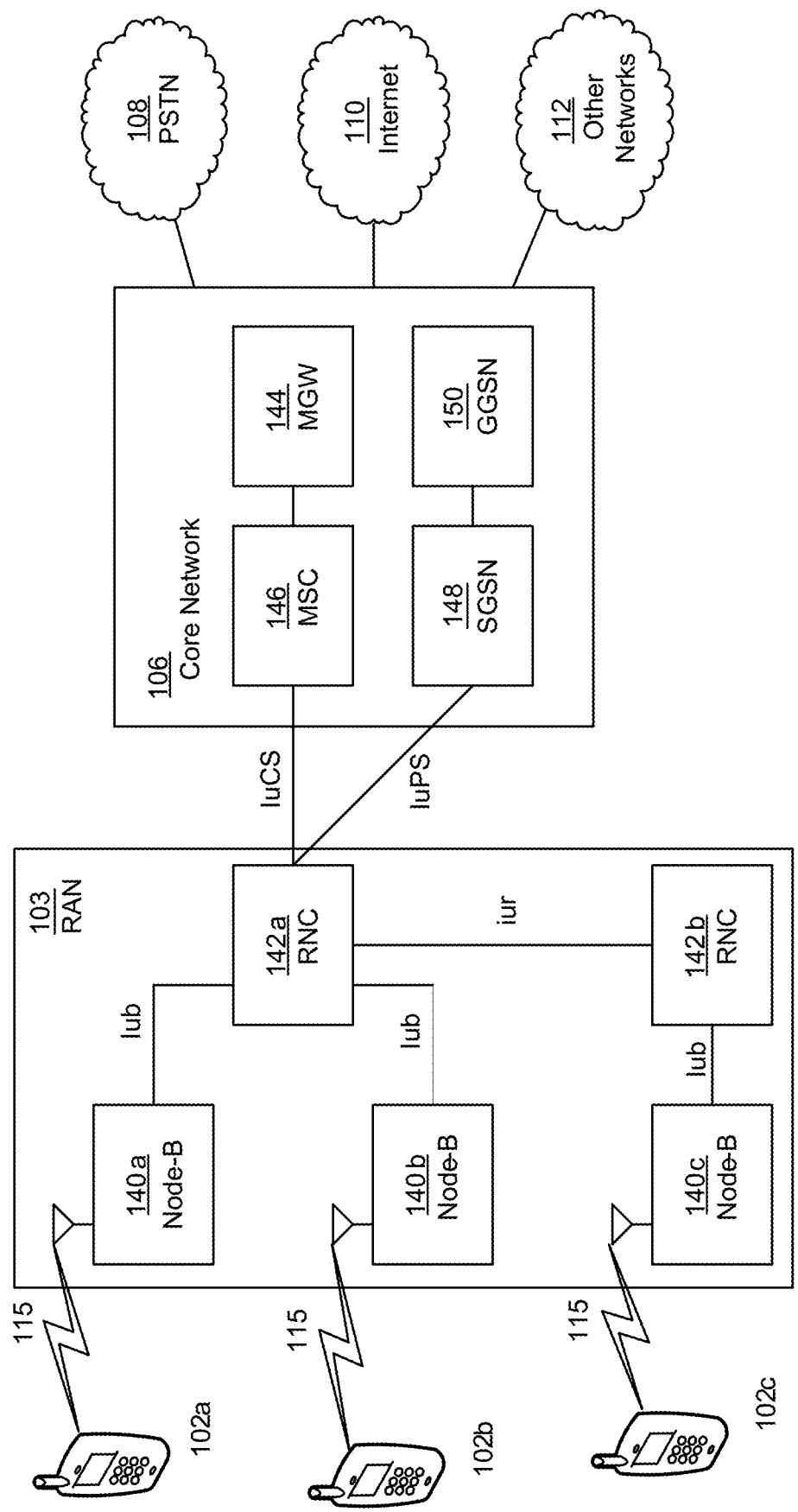
FIG. 18C is a system diagram of an example radio access network (RAN) and core network in accordance with an example embodiment.

FIG. 18C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 18C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 18C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 18C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 18D:
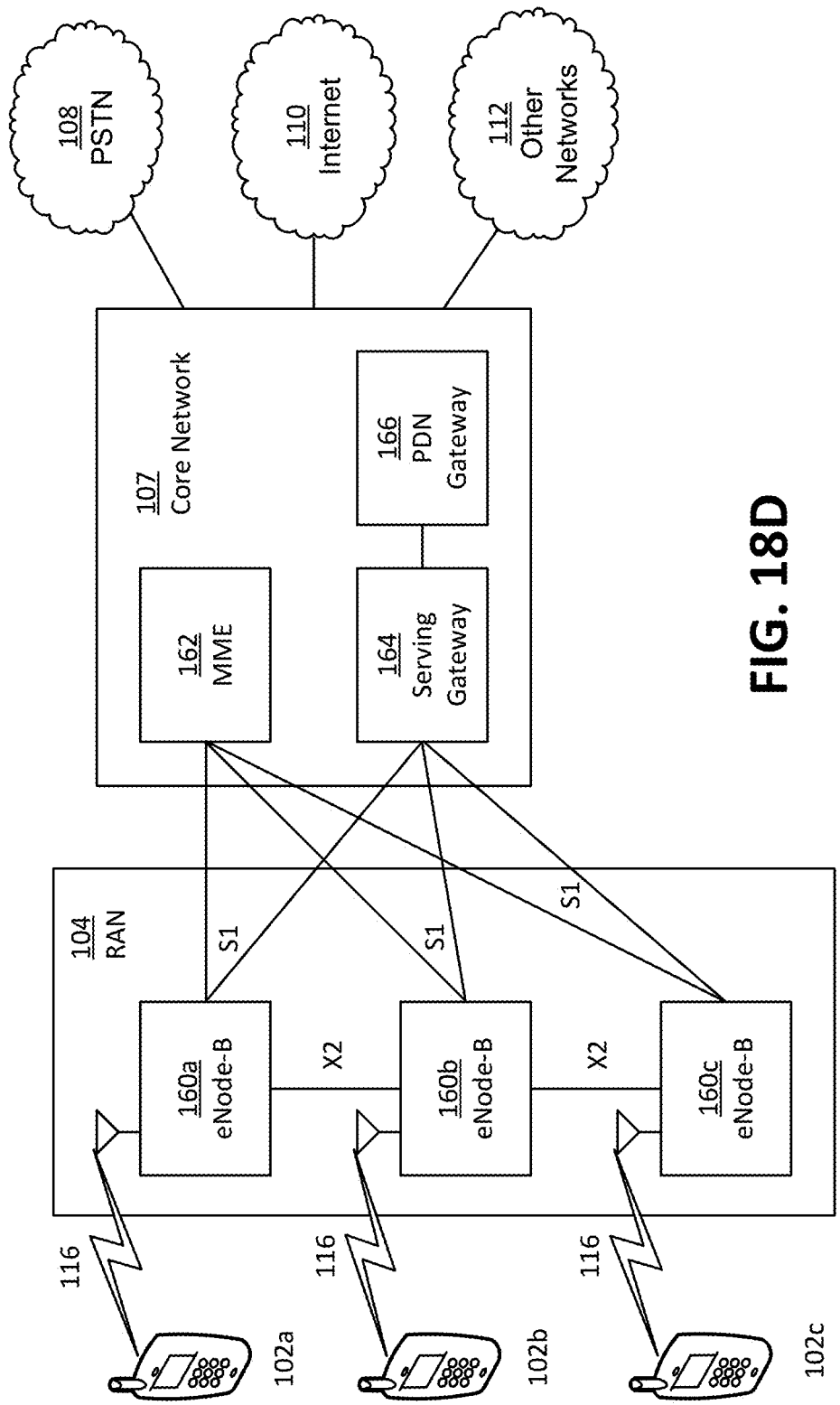
FIG. 18D is another system diagram of a RAN and core network according to another embodiment.

FIG. 18D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 18D, the eNode-Bs 160a, 160b, 160c may communicate with one another over an X2 interface.

The core network 107 shown in FIG. 18D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 18E:
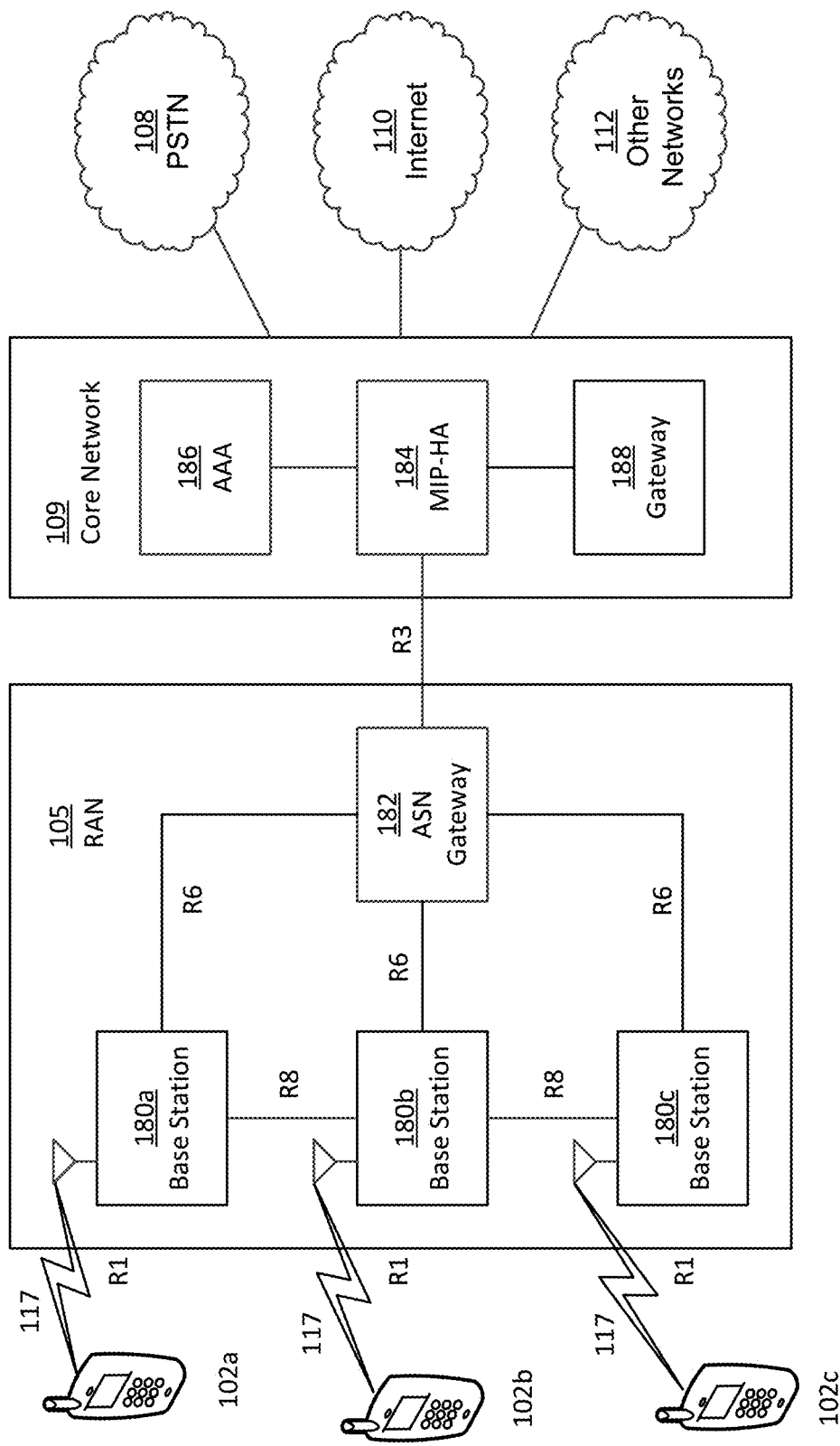
FIG. 18E is another system diagram of a RAN and core network according to another embodiment.

FIG. 18E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 18E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a,

180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 18E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 18E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 18A, 18C, 18D, and 18E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 18A, 18B, 18C, 18D, 18E, and 18G are provided by way of example only, and it is understood that the subject matter disclosed and claimed herein may be embodied or implemented in any similar communication system, whether presently defined or defined in the future.

Figure 18F:
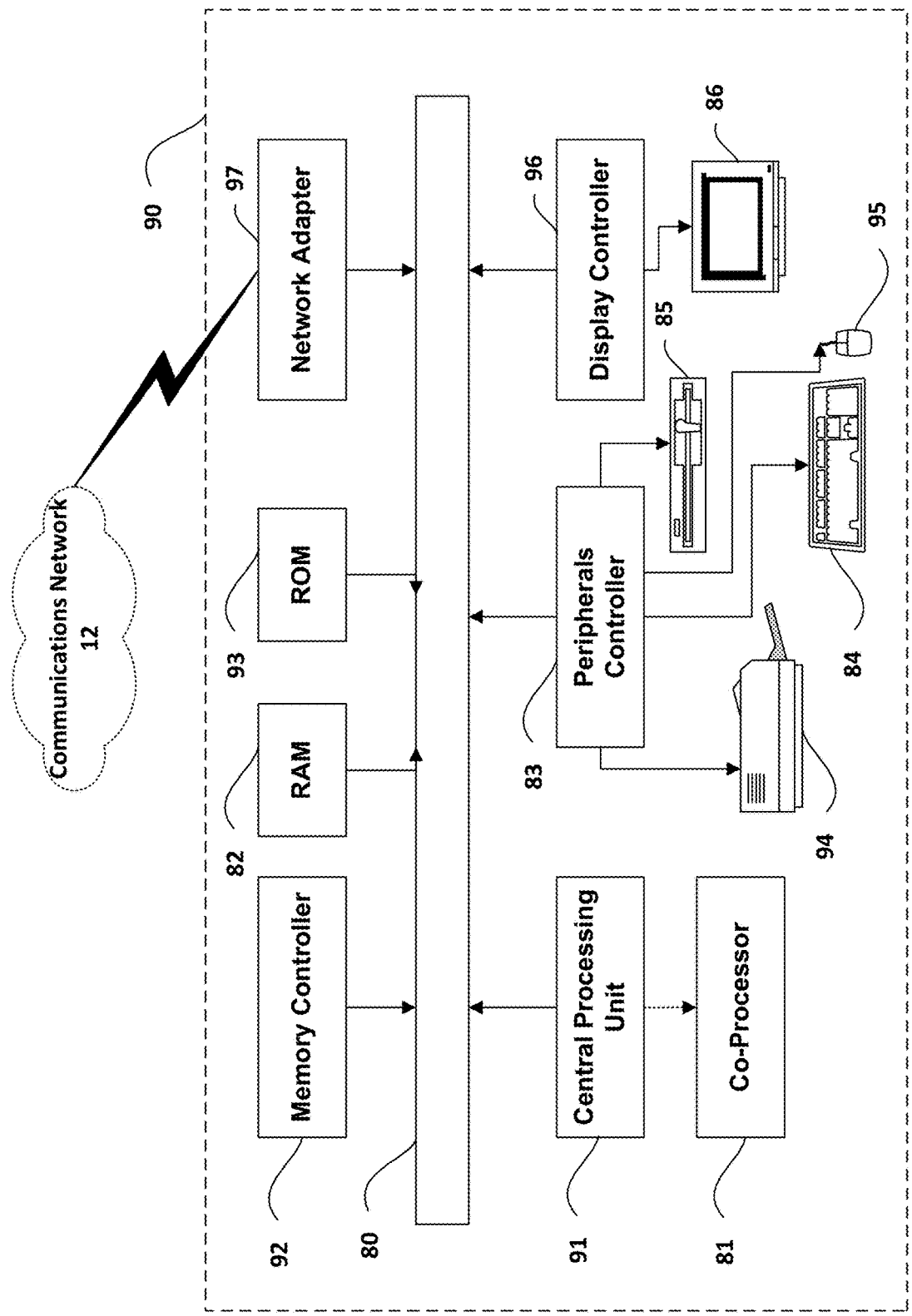
FIG. 18F is a block diagram of an exemplary computing system 90 in which one or more apparatuses of the communications networks illustrated in FIGS. 18A, 18C, 18D, 18E, and 18G may be embodied.

FIG. 18F is a block diagram of an exemplary computing system 90 in which one or more apparatuses of the communications networks illustrated in FIGS. 18A, 18C, 18D, 18E, and 18G may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 18A, 18B, 18C, 18D, 18E, and 18G to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 18G:
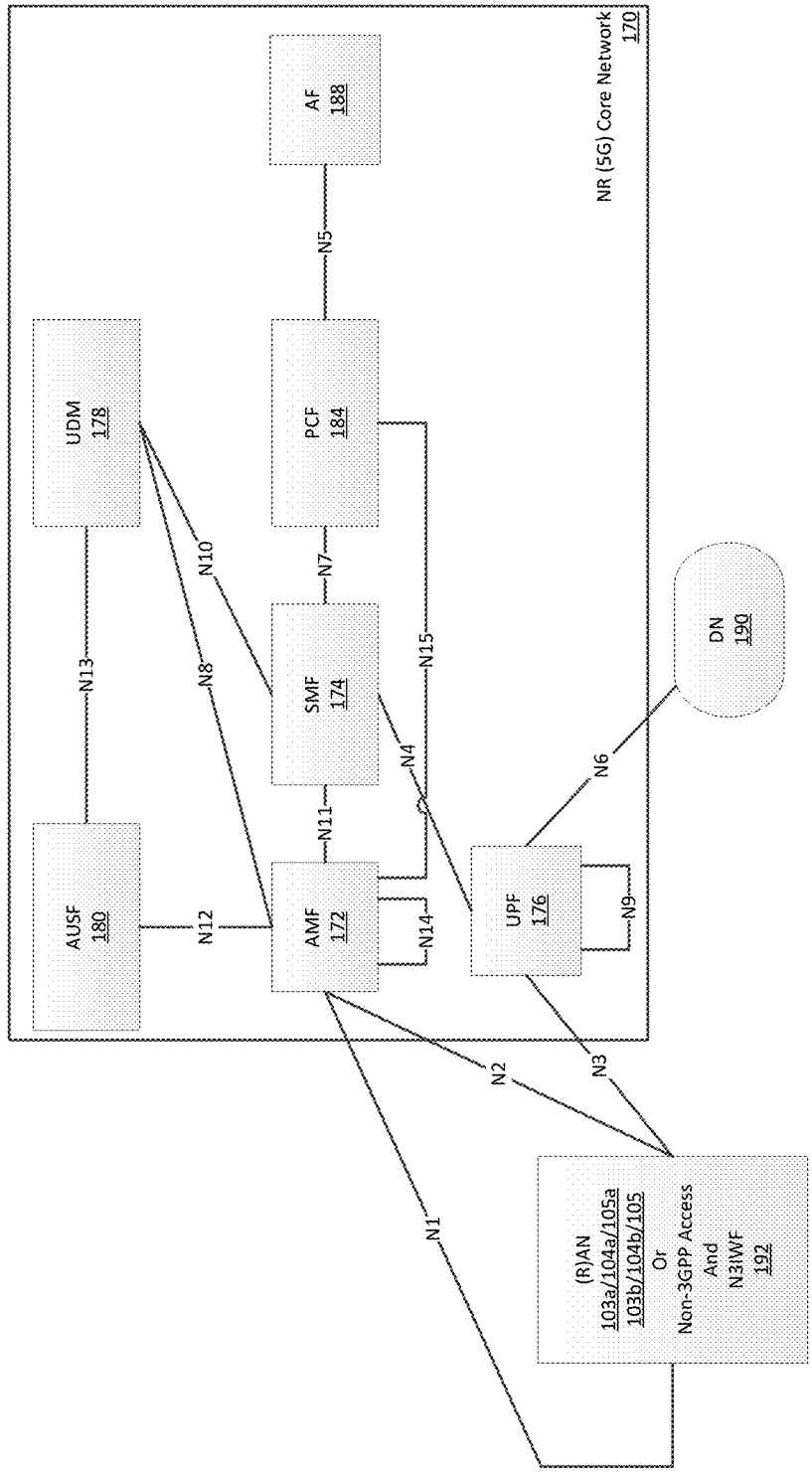
FIG. 18G is a system diagram of an example new radio (NR) (or 5G) core network in the methods and apparatuses described and claimed herein may be embodied.

Referring also to FIG. 18G, the example NR (or 5G) core network 170 shown in FIG. 18G may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the NR core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 18G shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, maybe connected to a PCF 184 via an N7 interface, and may be connected to the UPF 176 via an N4 interface. The SMF 174 may server as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the NR core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the NR core network 170. The NEF may connect to an AF 188 via an interface and it may connect to other control plane and user plane functions (180, 178, 172, 172, 184, 176, and N3IWF) in order to expose the capabilities and services of the NR core network 170.

The NR core network 170 may facilitate communications with other networks. For example, the core network 170 may include, or may communicate with, an IP gateway (e.g., an IP multimedia subsystem (IMS) server) that serves as an interface between the NR core network 170 and the PSTN 108. For example, the core network 170 may include, or communicate with, a short message service (SMS) service center that facilities communication via the short message service. For example, the NR core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description.
AE Application Entity
ADN Application Dedicated Node
ASN Application Service Node
CMDH Communication Management and Delivery Handling
CoAP Constrained Application Protocol
CRUD Create, Retrieve, Update, and Delete
CSE Common Services Entity
CSF Common Services Function
DDoS Distributed Denial of Service
DNS Domain Name System
DPI Deep Packet Inspection
E2E End-to-End
FMSS Flexible Mobile Service Steering
FQDN Fully Qualified Domain Name
GGSN Gateway GPRS Support Node
GPRS General Packet Radio Service
GTP GPRS Tunnel Protocol
HSS Home Subscriber Server
HTTP Hyper Text Transfer Protocol
IoT Internet of Things
IN Infrastructure Node
IP Internet Protocol
LAN Local Access Network
LI Lawful Intercept
LIAAS LI as a Service
MCN Mobile Core Network
MN Middle Node
MNO Mobile Network Operator
MQTT Message Queuing Telemetry Transport
MSB Most Significant Bit
MTC Machine-Type Communication
M2M Machine to Machine
NAT Network Address Translation
NEF Network Exposure Function
NF Network Function
NoDN Non-oneM2M Node
NSH Network Services Header
PCF Policy Control Function
PCRF Policy and Charging Rules Function
P-GW PDN Gateway
QoS Quality of Service
SCEF Service Capability Exposure Function
SCF Service Classification Function
SCTCF Service Chain Traffic Controller Function
SFC Service Function Chaining
SFF Service Function Forwarder
(S)Gi-LAN LAN between the GGSN/P-GW and the Internet
S-GW Serving Gateway
SL Service Layer
SPI Service Path ID
TCP Transmission Control Protocol
TLV Type, Length, Value
TDF Traffic Detection Function
UPF User Plane Function
UDR User Data Repository
VASs Value Added Services This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
  receiving a data packet that includes a name of a RESTful M2M service layer resource;
  determining, based on one or more policies provisioned in the apparatus, that more information is needed to determine how to handle the packet;
  querying, based on the determining that more information is needed to determine how to handle the packet, an M2M service layer for context information associated with the data packet, wherein the query includes at least part of the name of the RESTful M2M service layer resource;
  obtaining context information associated with the data packet;
  wherein the context information includes subscription information that is related to the name of the RESTful M2M service layer resource;
  based on the context information, identifying value added services of the network for processing the data packet; and
  sending the data packet toward the identified value added services.

2. The apparatus of claim 1, wherein the data packet is indicative of a Create, Retrieve, Update, Delete (CRUD) operation, and the query contains an attribute or a resource name from the CRUD operation.

3. The apparatus as recited in claim 1, wherein the querying the M2M service layer further comprises sending a query to a service capability exposure function or a network exposure function.

4. The apparatus of claim 1, wherein the computer-executable instructions stored in the memory of the apparatus, when executed by the processor of the apparatus, further cause the apparatus to perform operations comprising:

receiving a policy from the M2M service layer; and provisioning the policy in an edge gateway of the network, such that the edge gateway is configured to route packets in accordance with the policy, wherein the policy indicates which value added services should be applied to the traffic.

5. The apparatus as recited in claim 1, the method wherein the computer-executable instructions stored in the memory of the apparatus, when executed by the processor of the apparatus, further cause the apparatus to perform operations comprising:

querying a transport interworking function to determine whether the M2M service layer is authorized to steer traffic associated with a particular destination.

6. The apparatus as recited in claim 1, the method wherein the computer-executable instructions stored in the memory of the apparatus, when executed by the processor of the apparatus, further cause the apparatus to perform operations comprising:

querying a transport interworking function wherein the transport internetworking function is configured to determine whether the M2M service layer is authorized to steer traffic through one or more value added services of the network.

7. The apparatus as recited in claim 5, wherein querying the transport interworking function comprises sending an authorization request to the transport interworking function, the authorization request comprising at least one of an identifier of the M2M service layer, the destination of the traffic, or the one or more value added services that are requested.

8. The apparatus as recited in claim 4, wherein the policy is received from the M2M service layer via a service capability exposure function or a network exposure function.

9. A method performed by an apparatus within a network, the method comprising:

receiving a data packet that includes a name of a RESTful M2M service layer resource;

determining, based on one or more policies provisioned in the apparatus, that more information is needed to determine how to handle the packet;

querying, based on the determining that more information is needed to determine how to handle the packet, an M2M service layer for context information associated with the data packet wherein a query includes at least part of the name of the RESTful M2M service layer resource;

obtaining context information associated with the data packet;

based on the context information, identifying value added services of the network for processing the data packet; and sending the data packet toward the identified value added services.

10. The method as recited in claim 9, wherein the data packet is indicative of a Create, Retrieve, Update, Delete (CRUD) operation and the query contains an attribute or a resource name from the CRUD operation.

11. The method as recited in claim 9, wherein querying the M2M service layer further comprises sending a query to a service capability exposure function or a network exposure function.

* * * * *